United States Patent [19]

Noll et al.

[11] 4,242,258

[45] Dec. 30, 1980

[54] WATER-SOLUBLE DYESTUFFS, PROCESSES FOR THEIR MANUFACTURE, THEIR USE AS FIBER-REACTIVE DYESTUFFS FOR DYEING AND PRINTING FIBER MATERIALS AND THE FIBER MATERIALS DYED WITH THESE DYESTUFFS

[75] Inventors: Walter Noll, Bad Soden am Taunus; Fritz Meininger; Ernst Hoyer, both of Frankfurt am Main, all of Fed. Rep. of Germany

[73] Assignee: Hoechst Aktiengesellschaft, Frankfurt am Main, Fed. Rep. of Germany

[21] Appl. No.: 13,308

[22] Filed: Feb. 21, 1979

[30] Foreign Application Priority Data

Feb. 21, 1978 [DE] Fed. Rep. of Germany ....... 2807260

[51] Int. Cl.$^3$ ...................... C09B 31/30; C09B 33/00; C09B 35/00

[52] U.S. Cl. .................................... 260/152; 260/166; 260/164; 260/153

[58] Field of Search ................ 260/152, 166, 153, 164

[56] References Cited

U.S. PATENT DOCUMENTS

| | | | |
|---|---|---|---|
| 2,670,265 | 2/1954 | Heyna et al. | 260/152 X |
| 2,752,333 | 6/1956 | Lecher et al. | 260/152 X |
| 2,835,660 | 5/1958 | Baumann | 260/166 X |
| 2,871,230 | 1/1959 | Huss et al. | 260/166 X |
| 3,380,989 | 4/1968 | Remy | 260/166 X |
| 3,840,518 | 10/1974 | Schmitt et al. | 260/164 |
| 3,957,751 | 5/1976 | Bauer et al. | 260/153 X |
| 4,033,946 | 7/1977 | Goebel | 260/166 |
| 4,055,558 | 10/1977 | Goebel | 260/166 |
| 4,058,516 | 11/1977 | Mislin | 260/164 X |
| 4,072,672 | 2/1978 | Henzi | 260/152 X |

*Primary Examiner*—Paul F. Shaver

*Attorney, Agent, or Firm*—Curtis, Morris & Safford

[57] ABSTRACT

Water-soluble dyestuffs are described which in the acid form possess the formula

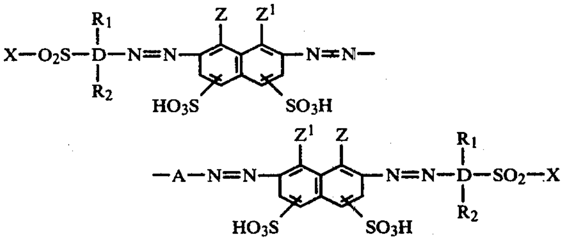

wherein D is a benzene or naphthalene nucleus, $R_1$ is linked to D in ortho-position to the azo group and means hydrogen, halogen, lower alkoxy, lower alkyl, carboxy or sulfo, $R_2$ is hydrogen, halogen, lower alkyl, lower alkoxy or sulfo and X is the vinyl group or a sulfato-, chloro- or thiosulfatoethyl group, A is a bridging member preferably selected from the diphenylene, diphenylsulfone and diphenylamine series, Z and $Z^1$ each represent a hydroxy or amino group with the proviso that each Z and each $Z^1$ have the same meaning. These novel dyestuffs are prepared by diazotization and coupling of the corresponding diazo and coupling components in usual manner known in the art. The novel dyestuffs possess a very valuable fiber-reactivity and are suitable for dyeing natural and regenerated cellulose or natural, regenerated or synthetic polyamide fiber materials. They can easily be applied and fixed by application methods usual and known in the art, and yield on these fiber materials dyeings and prints which possess good fastnesses, especially fastnesses to light, to washing, to perspiration and to cross-dyeing. Their fixation degree on the fiber material and correspondingly their tinctorial strength are outstanding.

2 Claims, No Drawings

WATER-SOLUBLE DYESTUFFS, PROCESSES FOR THEIR MANUFACTURE, THEIR USE AS FIBER-REACTIVE DYESTUFFS FOR DYEING AND PRINTING FIBER MATERIALS AND THE FIBER MATERIALS DYED WITH THESE DYESTUFFS

With the present invention, new water-soluble dyestuffs of the general formula (1)

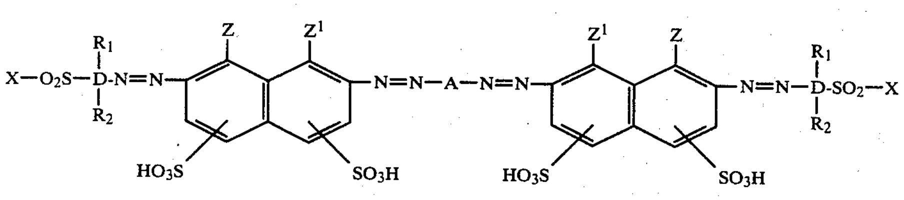
(1)

have been found.

The new dyestuffs of the formula (1) can be in the form of the free acid or in the form of their salts. Preferably, they are in the form of the salts, especially of the alkali metal salts and alkaline earth metal salts and in particular in the form of the sodium, potassium and calcium salts. They are preferably used in the form of the alkali metal salts for dyeing and printing fiber materials.

In the above formula (1), the various radicals in the formula have the following meaning: D is a benzene or naphthalene nucleus, $R_1$ is in the ortho-position relative to the azo group and denotes a hydrogen atom, a halogen atom, preferably a chlorine or bromine atom, a lower alkyl group, preferably a methyl group, a lower alkoxy group, preferably a methoxy group, a carboxy group or a sulfonic acid group and $R_2$ is a hydrogen atom, a halogen atom, preferably a chlorine or bromine atom, a lower alkyl group, preferably a methyl group, a lower alkoxy group, preferably a methoxy group, or a sulfonic acid group and $R_1$ and $R_2$ can be identical or different from one another, X is the β-thiosulfatoethyl or β-chloroethyl group and preferably the β-sulfatoethyl or vinyl group, Z represents the grouping $-(OH)_{n-1}$ or $-(NH_2)_{2-n}$ and $Z^1$ represents the grouping $-(OH)_{2-n}$ or $-(NH_2)_{n-1}$, in which n denotes the number 1 or 2, and A represents a divalent bridge member with aromatic carbocyclic and/or aromatic heterocyclic radicals, the bonds from A to the azo groups leading direct from the aromatic, carbocyclic and heterocyclic rings of A.

The bridge member A in particular denotes a radical of the formula

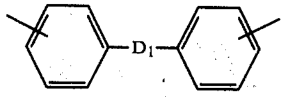

or of the formula

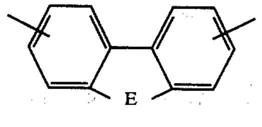

in which the benzene nuclei can be substituted by substituents, preferably 1 or 2 substituents, preferably by substituents from the group comprising lower alkyl, such as methyl, lower alkoxy, such as methoxy, sulfo, carboxy, nitro, chlorine, and in which $D_1$ is a direct covalent bond or a bridge member, for example one of the formulae $-CH_2-$, $-CH_2-CH_2-$, $-O-CH_2-O-$, $-O-CH_2-CH_2-O-$, $-CH{=}CH-$, $-NH-$, $-O-$, $-S-$, $-SO_2-$, $-N{=}N-$, $-NH-CO-NH-$, $-CO-NH-$, $-NH-CO-$, $-CO-$,

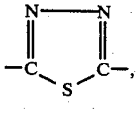, 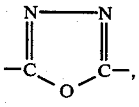, 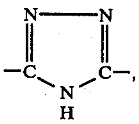,

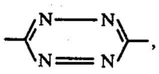, or 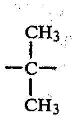

or a cyclohexylene radical, especially a cyclohexylene radical of the formula

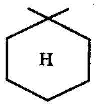, and preferably a bridge member of the formula $-CH_2-$, $-CH_2-CH_2-$, $-CH{=}CH-$, $-NH-$, $-SO_2-$, $-CO-NH-$ or $-NH-CO-$ or the above-mentioned divalent radical of oxadiazole or preferably a direct covalent bond, or $D_1$ is a radical of the formula

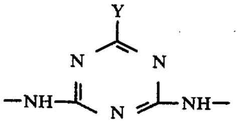

and E represent a member of the formula $-O-$, $-S-$, $-NH-$ or $-SO_2-$.

In the above triazine ring, Y denotes a chlorine, fluorine or bromine atom or a sulfonic acid group or a group consisting of a substituent bonded via a sulfur or oxygen atom, preferably of the formula $-S-R'$ or $-O-R''$, in which R' is preferably a substituent from the group comprising lower alkyl, substituted lower alkyl, phenyl, naphthyl, substituted phenyl, substituted naphthyl or 2-benzthiazolyl, such as, for example, lower alkyl substituted by substituents from the group comprising hydroxy, lower alkoxy, sulfato, sulfo, carboxy, phenyl, naphthyl, substituted phenyl and substituted naphthyl, or, for example, phenyl or naphthyl each substituted by substituents from the group comprising nitro, sulfo and carboxy, and R" denotes a hydrogen atom or has the meaning of R' with the exception of 2-benzthiazolyl, or Y is an amino group of the formula $—NR_3R_4$, in which $R_3$ is a hydrogen atom, an optionally substituted lower aliphatic radical or an optionally substituted araliphatic radical or a cycloaliphatic radical, such as, for example, a lower alkyl radical, which can be substituted by one or two substituents from the group comprising hydroxy, sulfato, lower alkoxy, sulfo, carboxy and phenyl, or a cyclohexyl radical, and $R_4$ represents a hydrogen atom or an optionally substituted lower aliphatic radical, such as, for example, a lower alkyl radical which can be substituted by hydroxy, lower alkoxy, sulfato, sulfo and carboxy, or represents an optionally substituted aromatic radical, such as, for example, a phenyl or naphthyl radical which can be substituted by one or two substituents from the group comprising hydroxy, carboxy, sulfo, lower alkyl and lower alkoxy, or represents an optionally substituted araliphatic radical, such as, for example, a lower alkyl radical which is substituted by phenyl or naphthyl, or represents a hydroxy group or a lower alkoxy group or represents an optionally substituted amino group, such as, for example, the amino group or a phenylamino or lower alkylamino group, or in which $R_3$ and $R_4$ together with the nitrogen atom form a ring containing a lower alkylene radical and optionally a heteroatom, such as, for example, a nitrogen or oxygen atom, such as, for example, a morpholine, piperidine or piperazine ring. In particular, the following radicals representing the bridging member A, can be mentioned as preferred:

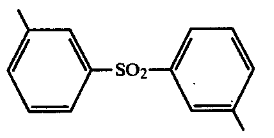
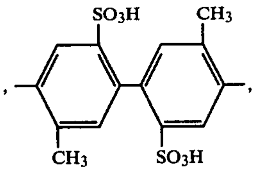
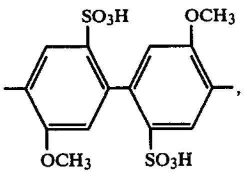
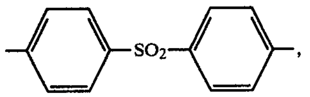
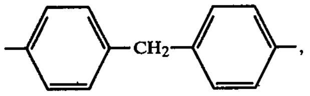
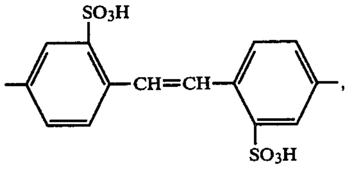
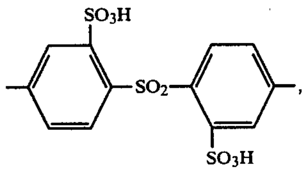
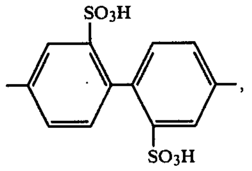

-continued

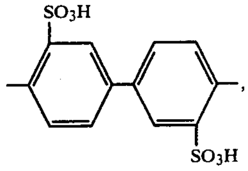
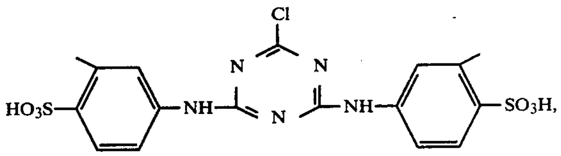
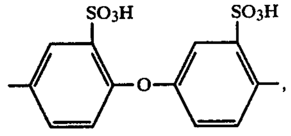
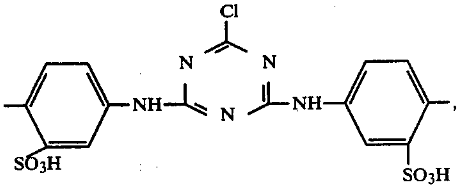
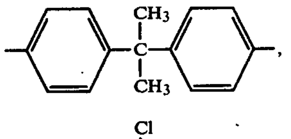
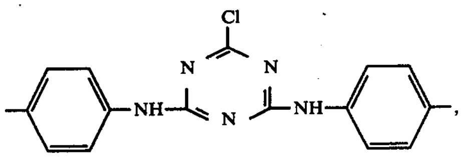
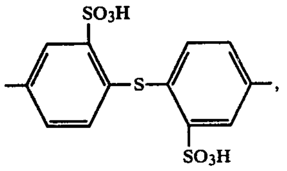
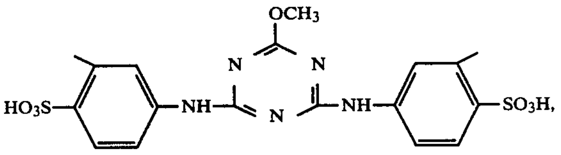
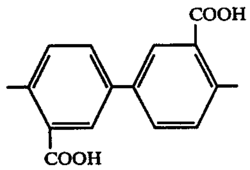
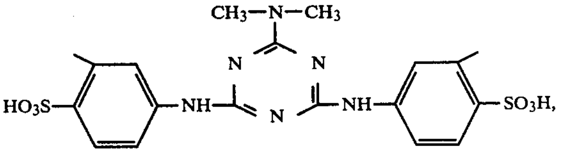

-continued

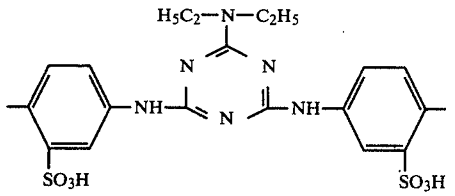

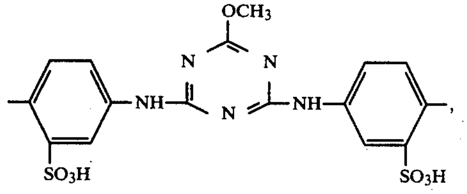

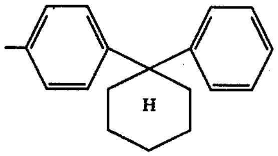

or

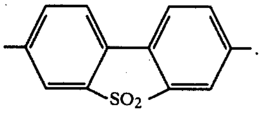

The two radicals

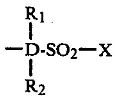

can have identical or different meanings in the general formula (1); preferably, they have the same meaning.

Here and in the text which follows, the term "lower" used in the above definitions denotes that the alkyl or alkylene radical contained in the group consists of 1–4 C atoms.

The present invention also relates to a process for the manufacture of the new dyestuffs of the formula (1) which comprises either diazotizing 2 moles of one or two aromatic amines, preferably of a single aromatic amine, of the general formula (2)

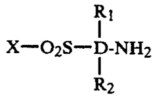

(2)

in which D, $R_1$, $R_2$ and X are as defined above and $R_1$ is in the ortho-position relative to the amino group, coupling the diazo compound or compounds with 2 moles of one or two coupling components, preferably of a single coupling component, of the general formula (3)

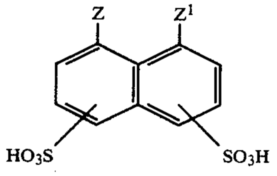

(3)

in which Z and $Z^1$ are as defined above and n represents the number 1, in the acid pH range, preferably at a pH of 0 to 4, and preferably at a temperature of −5° C. to +25° C. and also preferably in an aqueous medium, and coupling the monoazo compound or compounds, thus formed, of the general formula

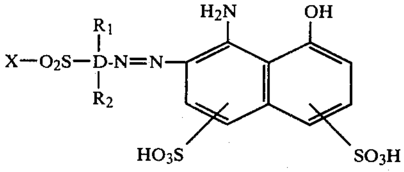

(4)

in which D, $R_1$, $R_2$ and X are as defined above, with 1 mole of a tetrazotized diamine of the general formula (5)

$$H_2N—A—NH_2 \quad (5)$$

in which A is as defined above and the bonds from A to the amino groups lead direct from the carbocyclic and heterocyclic rings, in the weakly acid to weakly alkaline pH range, preferably at a pH of 5.0 to 9.5, and preferably at a temperature of −5° C. to +25° C. and also preferably in an aqueous medium, or comprises coupling 1 mole of a tetrazotized diamine of the formula (5) with the abovementioned meaning with 2 moles of one or two coupling components, preferably a single coupling component, of the formula (3) described above, in which n represents the number 2, in the acid pH range, preferably at a pH of 0 to 4, and preferably at a temperature of −5° C. to +25° C. and also preferably in an aqueous medium, and coupling the disazo compound or compounds, thus prepared, of the general formula (6)

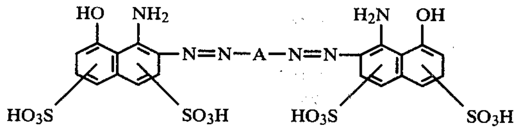

(6)

in which A is as defined above, with 2 moles of one or two diazotized amines, preferably of a single aromatic amine, of the above formula (2), in the weakly acid to weakly alkaline pH range, preferably at a pH of 5.0 to 9.5, and preferably at a temperature of −5° C. to +25° C. and also preferably in an aqueous medium. The compounds of the formulae (3), (4) and (6) can preferably be in the form of salts, such as alkali metal salts.

The diazotization of the aromatic amines of the formula (2) is carried out in accordance with generally known methods. However, care must be taken that these aromatic amines, and the diazonium salts obtained therefrom, are not subjected to any stronger alkaline conditions during processing.

The tetrazotization of the diamines of the formula (5) is also carried out in accordance with known methods, for example in the manner described by H. E. Fierz-David and L. Blangey in "Farbenchemie" ("Dye Chemistry"), 8th edition (1952), Springer Verlag (Vienna).

The resulting dyestuffs of the formula (1) are separated off by generally known methods, either by precipitating from the reaction medium by means of electrolytes, such as, for example, using sodium chloride or potassium chloride, or by evaporating the reaction solution, for example by spray-drying. If the latter method of isolating the dyestuff is chosen, it is in many cases advisable, before evaporating, to remove any amounts of sulfate which may be present in the solution by precipitating these as gypsum and separating them off by filtration. In some cases, it can also be desirable to supply the dyestuff solution direct, if appropriate after adding buffer substances and concentrating if necessary, as liquid preparations for use in dyeing.

Preferred dyestuffs, according to the invention, of the formula (1) are those in which D represents a benzene nucleus and furthermore those in which D represents a naphthalene nucleus, in which the azo group is bonded in the β-position of this naphthalene nucleus. Further preferred dyestuffs are those which contain, as the coupling component, the divalent radical of 1-amino-8-naphthol-3,6-disulfonic acid or of 1-amino-8-naphthol-4,6-disulfonic acid.

In addition to the said halogen atoms and the sulfonic acid group, the following individual groups are to be singled out as substituents Y in the triazine ring of the member A in the formula of the dyestuffs of the formula (1):

$-O-CH_3$, $-O-C_2H_5$, $-O-CH_2-CH_2-CH_3$, $-OH$,

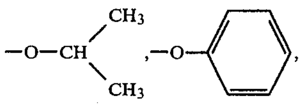 , $-S-CH_2-CH_2-OH$,

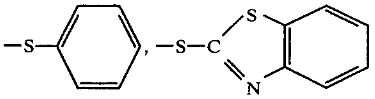

$-S-CH_2-COOH$; 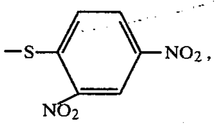

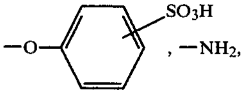 , $-NH_2$, $-NH-CH_3$, $-NHC_2H_5$, $-NHC_3H_7$, 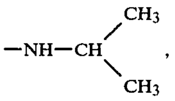

$-NH-CH_2-CH_2-OH$, $-NH-CH_2-CH_2-CH_2-OH$, $-NH-CH_2-CH_2-OSO_3H$, $-NH-CH_2-CH_2-O-CH_3$, 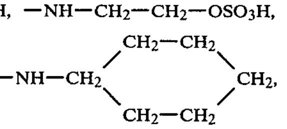

$-NH-CH_2-CH_2-SO_3H$, $-NH-CH_2-COOH$,

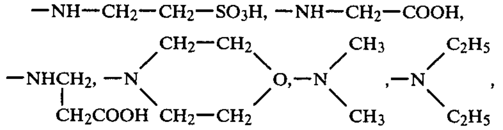

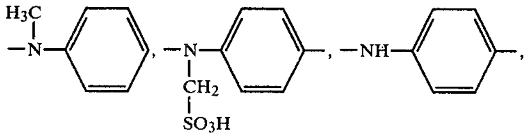

-continued

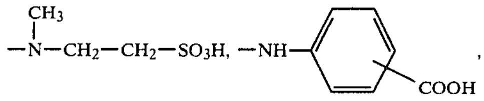

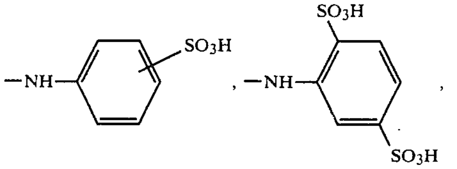

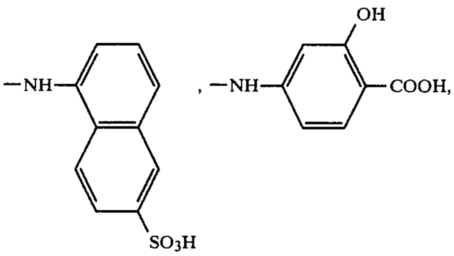 , $-NH-OH$, $-NH-NH_2$, 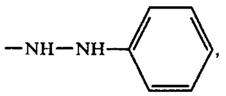

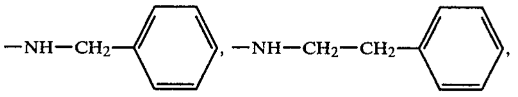

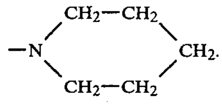

The member Y in the formula is, however, preferably a halogen atom.

Aromatic amines of the formula (2) are known, for example from German Patent Specifications Nos. 1,278,041, 1,276,842, 1,150,163, 1,126,542 and 1,153,029, from German Offenlegungsschriften 2,154,943, 2,100,080, 2,034,591 and 1,943,904 and from German Auslegeschrift 1,204,666.

Aromatic amines of the formula (2) which may be mentioned are, in particular, the following compounds: aniline-3-β-sulfatoethylsulfone, aniline-4-β-sulfatoethylsulfone, 2-amino-toluene-4-β-sulfatoethylsulfone, 2-aminoanisole-4-β-sulfatoethylsulfone, 2-amino-anisole-5-β-sulfatoethylsulfone, 2-amino-phenetol-4-β-sulfatoethylsulfone, 2-amino-phenetol-5-β-sulfatoethylsulfone, 2-amino-4-β-sulfatoethylsulfonyl-benzoic acid, 2,5-dimethoxyaniline-4-β-sulfatoethylsulfone, 2,4-dimethoxyaniline-5-β-sulfatoethylsulfone, 2-methoxy-5-methylaniline-4-β-sulfatoethylsulfone, 4-aminoanisole-3-β-sulfatoethylsulfone, 4-aminotoluene-3-β-sulfatoethylsulfone, 4-β-sulfatoethylsulfonylaniline-2-sulfonic acid, 5-β-sulfatoethylsulfonyl-aniline-2-sulfonic acid, 2-amino-toluene-5-β-sulfatoethylsulfone, 2-chloroaniline-4-β-sulfatoethylsulfone, 2-chloroaniline-5-β-sulfatoethylsulfone, 2-bromoaniline-4-β-sulfatoethylsulfone, 2,6-dichloroaniline-4-β-sulfatoethylsulfone, 2,6-dimethylaniline-3-β-sulfatoethylsulfone, 2,6-dimethyl-4-β-sulfatoethylsulfone, 2,4,6-trimethylaniline-3-β-sulfatoethysulfone, 2-naphthylamine-5-β-sulfatoethylsulfone, 2-naphthylamine-6-β-sulfatoethylsulfone, 2-naphthylamine-8-β-sulfatoethylsulfone, 8-β-sulfatoethylsulfonyl-2-aminonaphthalene-6-sulfonic acid, 6-β-sulfatoethylsulfonyl-2-amino-naphthalene-1-sulfonic acid and also the corresponding vinylsulfones, $\beta$-thiosulfatoethylsulfones and $\beta$-chloroethylsulfones.

Aromatic diamines of the general formula (5) which may be mentioned are, in particular, the following compounds: 3,3′-diaminodiphenylsulfone, 4,4′-diaminodiphenylsulfone, 3,3′-diaminodiphenylsulfone-disulfonic acid, 4,4′-diaminostilbene-2,2′-disulfonic acid, 2,7′-diaminodiphenylenesulfone, 2,7′-diamino-diphenylenesulfone-4,5-disulfonic acid, 4,4′-diamino-benzophenone, 4,4′-diamino-3,3′-dinitro-benzophenone, 3,3′-diamino-4,4′-dichlorobenzophenone, 4,4′-diamino-diphenyl-methane, 4,4′-diaminodiphenyl, 3,3′-diamino-diphenyl, 4,4′-diamino-3,3′-dichlorodiphenyl, 4,4′-diamino-3,3′-dimethoxy-diphenyl, 4,4′-diamino-3,3′-dimethyl-diphenyl, 4,4′-diamino-2,2′-dimethyldiphenyl, 4,4′-diamino-2,2′-dichloro-diphenyl, 4,4′-diamino-3,3′-diethoxy-diphenyl, 4,4′-diamino-3,3′-dimethyl-6,6′-dinitro-diphenyl, 4,4′-diamino-3,3′-disulfo-diphenyl, 4,4′-diamino-2,2′-disulfo-diphenyl, 4,4′-diamino-3,3′-dimethyl-6,6′-disulfo-diphenyl, 4,4′-diamino-3,3′-dimethoxy-6,6′-disulfo-diphenyl, 4,4′-diamino-2,2′-dimethoxy-6,6′-disulfo-diphenyl, 4,4′-diamino-2,2′,5,5′-tetrachlorodiphenyl, 4,4′-diamino-3,3′-dinitro-diphenyl, 4,4′-diamino-2,2′-dichloro-5,5′-dimethoxy-diphenyl, 4,4′-diamino-diphenyl-2,2′-dicarboxylic acid, 4,4′-diamino-diphenyl-3,3′-dicarboxylic acid, 4,4′-diamino-3,3′-dimethyl-diphenyl-5,5′-disulfonic acid, 4,4′-diamino-4-methyl-diphenyl, 4,4′-diamino-2-nitrcdiphenyl, 4,4′-diamino-3-ethoxy-diphenyl, 4,4′-diamino-3-sulfo-diphenyl, 4,4′-diamino-3,3′-dimethyl-5-sulfo-diphenyl, 4,4′-diamino-3,3′-dimethyl-diphenylmethane, 4,4′-diamino-2,2′,3,3′-tetramethyl-diphenylmethane, 4,4′-diaminodiphenylethane, 4,4′-diamino-stilbene, 4,4′-diamino-diphenyldimethylmethane, 4,4′-diamino-diphenylmethane-3,3′-dicarboxylic acid, 3,6-diamino-carbazole and also the diamines of the formulae

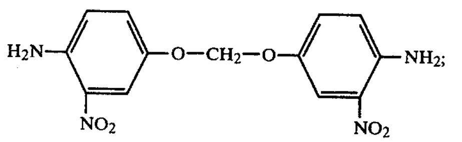

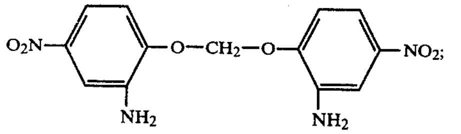

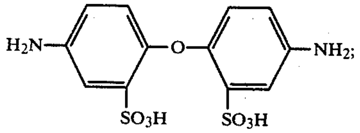

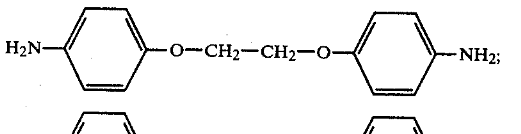

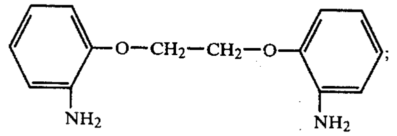

-continued

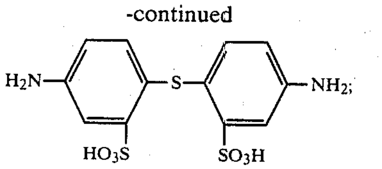

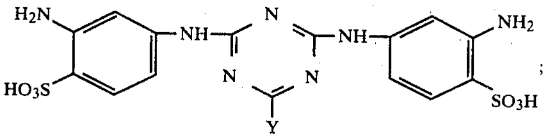

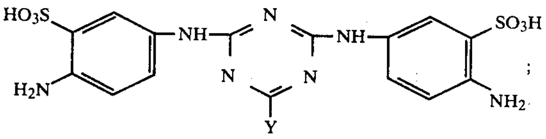

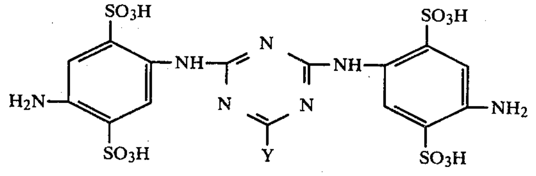

in which Y is as defined above.

The present invention also relates to the dyeing and printing of cellulose and polyamide fiber materials with the dyestuffs, according to the invention, of the formula (1) and also to these fiber materials which have been dyed or printed with a dyestuff of the formula (1).

Cellulose fiber materials are understood as meaning preferably cotton and regenerated cellulose, but also other vegetable fibers, such as linen, hemp and jute. Polyamide fiber materials are to be understood as meaning both those of natural origin and those of synthetic origin, thus, for example, wool and other animal hairs and silk and also polyamide 6,6, polyamide 6, polyamide 11 or polyamide 4.

The dyestuffs according to the invention can be applied to the said substrates by the application techniques known for reactive dyestuffs. Thus, with these dyestuffs very good color yields are obtained on cellulose fibers by the exhaustion method from a long liquor, using very diverse alkali additives.

Excellent color yields are also obtained on cellulose fibers by the pad method, and the dyes can be fixed by a residence time at room temperature, by steaming or with dry heat.

Intense prints with outlines in a good state and a clear white ground are also obtained by the conventional printing processes for cellulose fibers, such as in a single-phase process in the presence of sodium bicarbonate or an other acid-binding agent in the printing paste with subsequent steaming at 101°-103° C., or in a two-phase process printing with a neutral or weakly acid printing paste and then either passing through a hot electrolyte-containing alkaline bath or over-padding with an alkaline electrolyte-containing padding liquor and then developing by means of a residence time, steaming or dry heat. The appearance of the prints is only slightly dependent on changing fixing conditions. Both in dyeing and in printing, the degrees of fixation obtained with the dyestuffs according to the invention are exceptionally high.

The fastness properties of the dyeings and prints obtained on cellulose fibers with the aid of the dyestuffs according to the invention are appreciable. This applies both in the case of the most important fastness to processing and in the case of the most important fastness properties in use. The fastness to light, the fastness to wet processing, such as fastness to washing, fastness to milling, fastness to water, fastness to seawater, fastness to cross-dyeing and fastness to perspiration, and also the fastness to pleating, fastness to ironing and fastness to rubbing should be mentioned in particular.

The dyeings on polyamide fibers are usually carried out from an acid medium. Thus, for example, acetic acid or acetic acid and ammonium acetate can be added to the dye-bath in order to obtain the desired pH value. In order to obtain a usable levelness of the dyeings, it is advisable to add conventional levelling agents, for example those based on a reaction product of cyanuric chloride with three times the molar amount of an aminobenzenesulfonic acid and/or of an aminonaphthalenesulfonic acid and/or those based on a reaction product of, for example, stearylamine with ethylene oxide. The dyeings can be carried out either at the boil or at 110°-120° C.

In the examples which follow, the parts are parts by weight unless stated otherwise. The relationship between parts by weight and parts by volume is the same as that between kilogram and liter. The percentage data relate to percentages by weight, unless stated otherwise.

EXAMPLE 1

2.48 parts of 3,3'-diaminodiphenylsulfone are diazotized in 100 parts of water, 30 parts of 2 N hydrochloric acid and 50 parts of ice with 4.1 parts of 5 N sodium nitrite solution. The excess nitrite is destroyed with amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction has ended. The following diazonium solution, prepared from 5.62 parts of 4-β-sulfatoethylsulfonylaniline, 100 parts of water, 30 parts of 2 N hydrochloric acid, 100 parts of ice and 4.1 parts of 5 N sodium nitrite solution, is added to the red dyestuff solution thus obtained. The excess nitrite is destroyed with amidosulfonic acid. 5 parts of crystalline sodium acetate are added, and the pH value is adjusted to 4.5-5 with 10% strength sodium carbonate solution. After the coupling reaction has ended, a blue dyestuff solution is obtained. The dyestuff is isolated by spray-drying. When used to dye or print cotton in the presence of an acid-binding agent by conventional processes, it gives a bluish-tinged black with very good fastness properties to wet processing and good fastness to light.

EXAMPLE 2

If, in Example 1, the 6.38 parts of 1-amino-8-naphthol-3,6-disulfonic acid are replaced by 6.38 parts of 1-amino-8-naphthol-4,6-disulfonic acid and the procedure followed is the same as that described above, an isomeric dyestuff with similar properties is obtained.

Polyazo dyestuffs with similar properties can be obtained by a similar procedure by using the corresponding equimolar amounts of the substances indicated in Table (1) which follows.

TABLE 1

| Example | 1st diazo component | Coupling component | 2nd diazo component | Color shade on cotton |
|---|---|---|---|---|
| 3 | 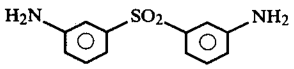 | 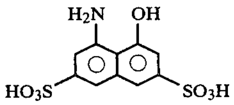 | 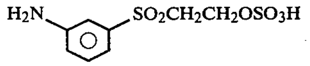 | black |
| 4 | ″ | ″ | 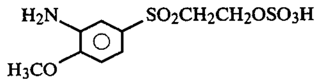 | black |
| 5 | ″ | ″ | 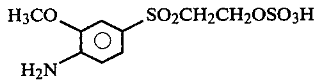 | black |
| 6 | ″ | ″ | 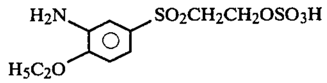 | black |
| 7 | ″ | ″ | 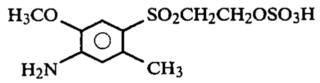 | black |
| 8 | ″ | ″ | 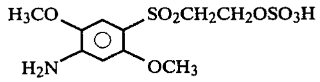 | black |
| 9 | ″ | ″ | 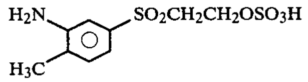 | black |
| 10 | ″ | ″ | 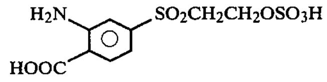 | black |
| 11 | ″ | ″ | 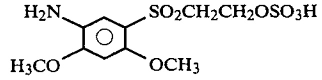 | black |
| 12 | ″ | ″ | 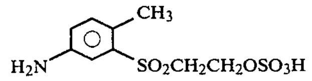 | black |

TABLE 1-continued
| Example | 1st diazo component | Coupling component | 2nd diazo component | Color shade on cotton |
|---|---|---|---|---|
| 13 | " | " | 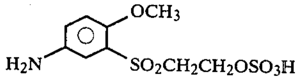 | black |
| 14 | " | " | 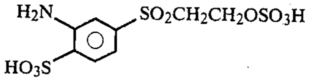 | black |
| 15 | " | " | 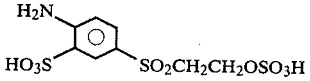 | black |
| 16 | " | " | 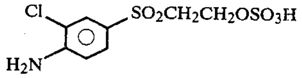 | black |
| 17 | " | " | 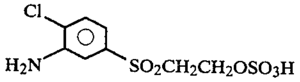 | black |
| 18 | " | " | 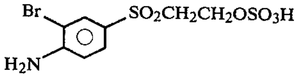 | black |
| 19 | " | " | 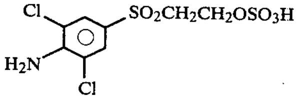 | black |
| 20 | " | " | 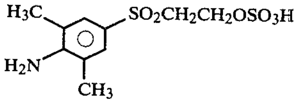 | black |
| 21 | " | " | 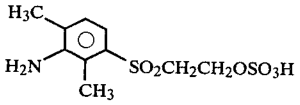 | black |
| 22 | " | " | 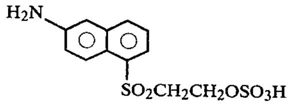 | black |
| 23 | " | " | 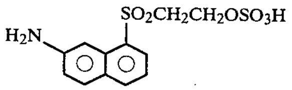 | black |
| 24 | " | " | 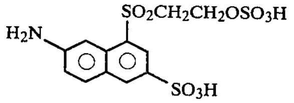 | black |
| 25 | " | " | 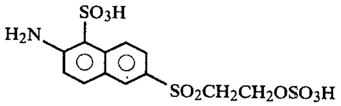 | black |
| 26 | " | " | 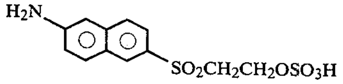 | black |
| 27 | " | 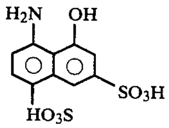 | 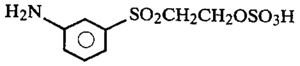 | black |
| 28 | " | " | 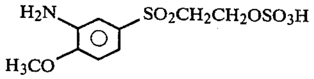 | black |
| 29 | " | " | 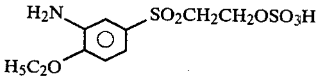 | black |
| 30 | " | " | 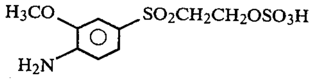 | black |

TABLE 1-continued
| Example | 1st diazo component | Coupling component | 2nd diazo component | Color shade on cotton |
|---|---|---|---|---|
| 31 | " | " | 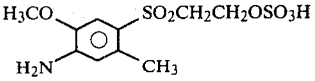 | black |
| 32 | " | " | 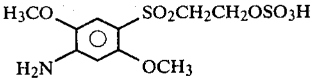 | black |
| 33 | " | " | 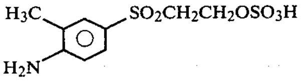 | black |
| 34 | " | " | 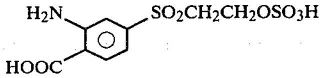 | black |
| 35 | " | " | 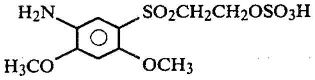 | black |
| 36 | " | " | 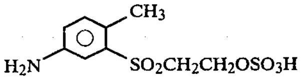 | black |
| 37 | " | " | 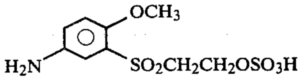 | black |
| 38 | " | " | 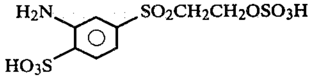 | black |
| 39 | " | " | 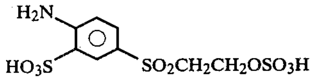 | black |
| 40 | " | " | 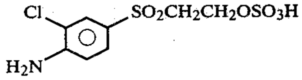 | black |
| 41 | " | " | 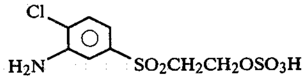 | black |
| 42 | " | " | 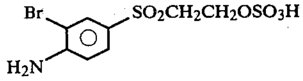 | black |
| 43 | " | " | 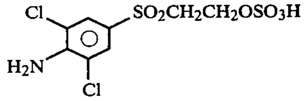 | black |
| 44 | " | " | 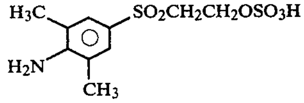 | black |
| 45 | " | " | 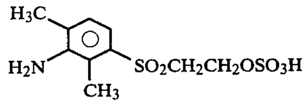 | black |
| 46 | " | " | 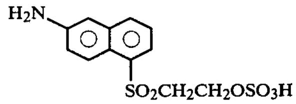 | black |
| 47 | " | " | 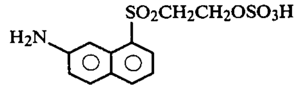 | black |
| 48 | " | " | 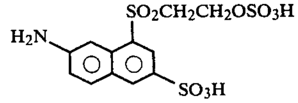 | black |
| 49 | " | " | 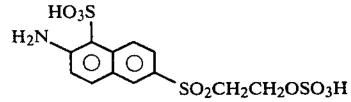 | black |

TABLE 1-continued
| Example | 1st diazo component | Coupling component | 2nd diazo component | Color shade on cotton |
|---|---|---|---|---|
| 50 | " | " | 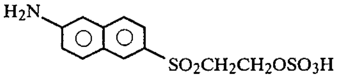 | black |
| 51 | " | 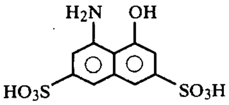 | 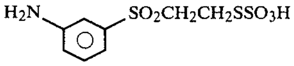 | black |
| 52 | " | " | 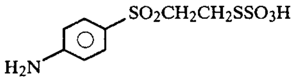 | black |
| 53 | " | " | 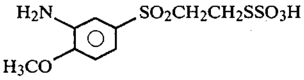 | black |
| 54 | " | " | 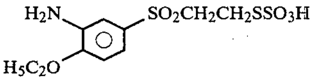 | black |
| 55 | " | " | 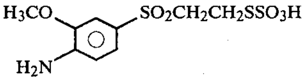 | black |
| 56 | " | " | 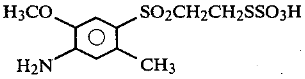 | black |
| 57 | " | " | 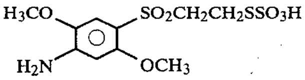 | black |
| 58 | " | " | 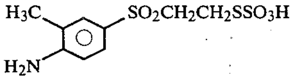 | black |
| 59 | " | " | 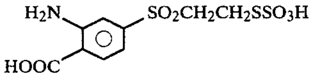 | black |
| 60 | " | " | 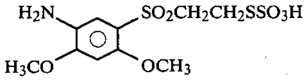 | black |
| 61 | " | " | 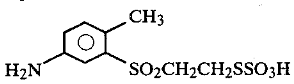 | black |
| 62 | " | " | 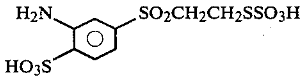 | black |
| 63 | " | " | 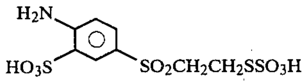 | black |
| 64 | " | " | 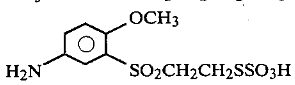 | black |
| 65 | " | " | 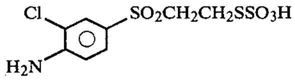 | black |
| 66 | " | " | 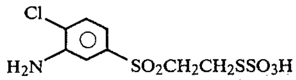 | black |
| 67 | " | " | 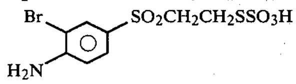 | black |
| 68 | " | " | 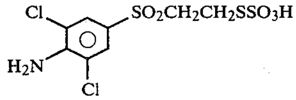 | black |
| 69 | " | " | 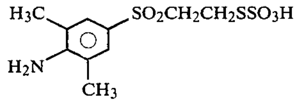 | black |

TABLE 1-continued
| Example | 1st diazo component | Coupling component | 2nd diazo component | Color shade on cotton |
|---|---|---|---|---|
| 70 | " | " | 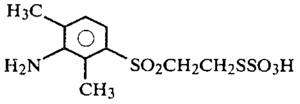 | black |
| 71 | " | " | 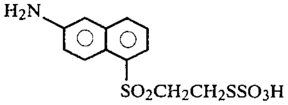 | black |
| 72 | " | " | 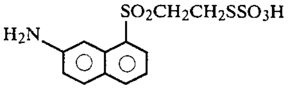 | black |
| 73 | " | " | 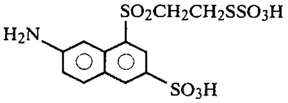 | black |
| 74 | " | " | 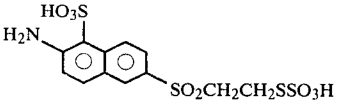 | black |
| 75 | " | " | 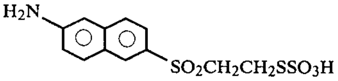 | black |
| 76 | " | 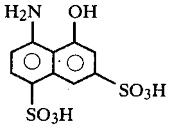 | 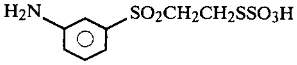 | black |
| 77 | " | " | 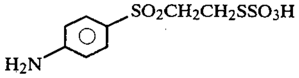 | black |
| 78 | " | " | 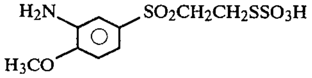 | black |
| 79 | " | " | 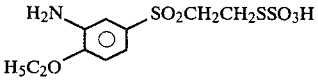 | black |
| 80 | " | " | 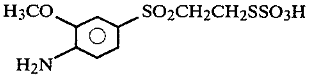 | black |
| 81 | " | " | 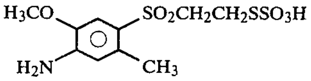 | black |
| 82 | " | " | 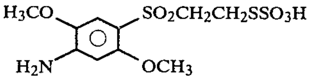 | black |
| 83 | " | " | 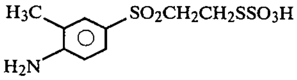 | black |
| 84 | " | " | 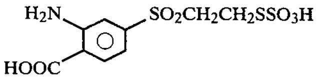 | black |
| 85 | " | 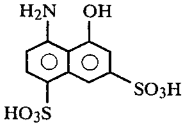 | 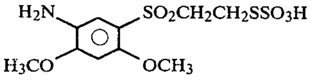 | black |
| 86 | " | " | 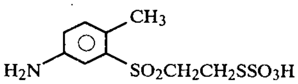 | black |
| 87 | " | " | 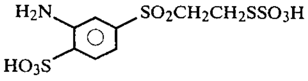 | black |

TABLE 1-continued

| Example | 1st diazo component | Coupling component | 2nd diazo component | Color shade on cotton |
|---|---|---|---|---|
| 88 | " | " | 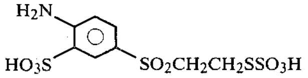 | black |
| 89 | " | " | 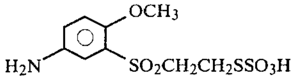 | black |
| 90 | " | " | 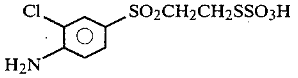 | black |
| 91 | " | " | 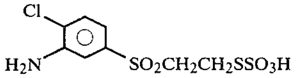 | black |
| 92 | " | " | 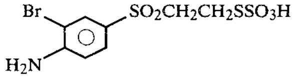 | black |
| 93 | " | 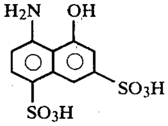 | 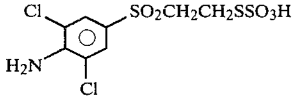 | black |
| 94 | " | " | 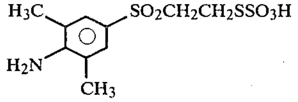 | black |
| 95 | " | " | 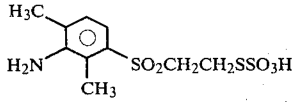 | black |
| 96 | " | " | 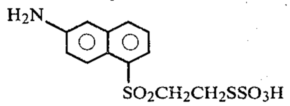 | black |
| 97 | " | " | 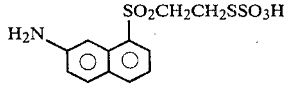 | black |
| 98 | " | " | 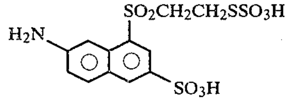 | black |
| 99 | " | " | 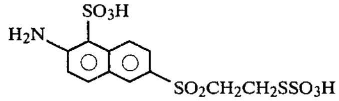 | black |
| 100 | " | " | 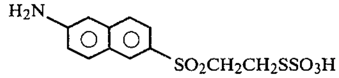 | black |

EXAMPLE 101

2.48 parts of 3,3'-diaminodiphenylsulfone are diazotized in 100 parts of water, 30 parts of 2 N hydrochloric acid and 50 parts of ice with 4.1 parts of 5 N sodium nitrite solution. Excess nitrite is destroyed with amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction has ended. A diazonium solution prepared from 3.66 parts of vinylsulfonylaniline, 100 parts of water, 30 parts of 2 N hydrochloric acid, 100 parts of ice and 4.1 parts of 5 N sodium nitrite solution is now added. Excess sodium nitrite is destroyed with amidosulfonic acid. 5 parts of crystalline sodium acetate are added to the mixture and the pH value is adjusted to 4.5–5.0 with 10% strength sodium carbonate solution. After the coupling reaction has ended, the dyestuff is precipitated with potassium chloride, filtered off and washed with potassium chloride solution. After drying in vacuo at 50°–60° C., a dark powder is obtained which dissolves in water to give a blue color. On cotton, dyeings or prints in black shades with very good fastness properties to wet processing and good fastness to light are obtained by conventional processes in the presence of acid-binding agents.

EXAMPLE 102

If the 6.38 parts of 1-amino-8-naphthol-3,6-disulfonic acid in Example 101 are replaced by 6.38 parts of 1-amino-8-naphthol-4,6-disulfonic acid and in other respects the procedure followed is the same as that described above, an isomeric dyestuff with similar properties is obtained.

EXAMPLE 103

If, in the above Examples 101 and 102, the 3.66 parts of 4-vinylsulfonylaniline are replaced by 4.39 parts of 4-β-chloroethylsulfonylaniline and in other respects the procedure followed is the same as that described above, dyestuffs with similar properties are obtained.

Polyazo dyestuffs with similar properties can be obtained by a similar procedure by using the corresponding equimolar amounts of the substances indicated in Table 2 which follows.

TABLE 2

| Example | 1st diazo component | Coupling component | 2nd diazo component | Color shade on cotton |
|---|---|---|---|---|
| 104 | 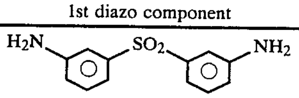 | 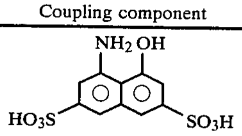 | 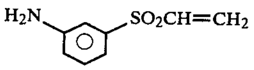 | black |
| 105 | " | " | 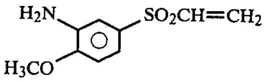 | black |
| 106 | " | " | 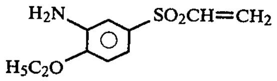 | black |
| 107 | " | " | 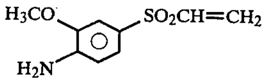 | black |
| 108 | " | " | 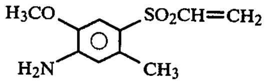 | black |
| 109 | " | " | 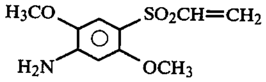 | black |
| 110 | " | " | 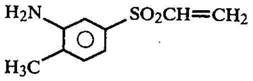 | black |
| 111 | " | " | 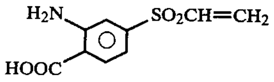 | black |
| 112 | " | " | 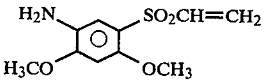 | black |
| 113 | " | " | 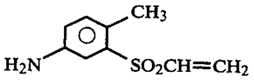 | black |
| 114 | " | " | 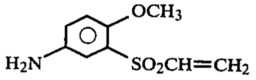 | black |
| 115 | " | " | 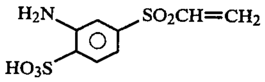 | black |
| 116 | " | " | 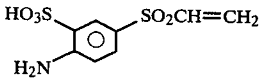 | black |
| 117 | " | " | 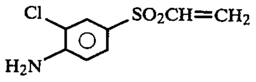 | black |
| 118 | " | " | 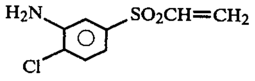 | black |
| 119 | " | " | 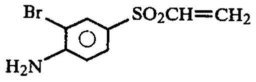 | black |
| 120 | " | " | 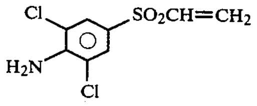 | black |

TABLE 2-continued
| Example | 1st diazo component | Coupling component | 2nd diazo component | Color shade on cotton |
|---|---|---|---|---|
| 121 | " | " | 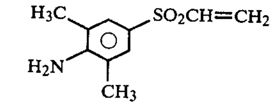 | black |
| 122 | " | " | 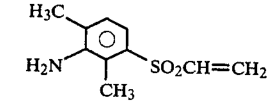 | black |
| 123 | " | " | 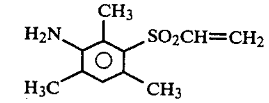 | black |
| 124 | " | " | 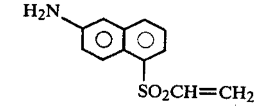 | black |
| 125 | " | " | 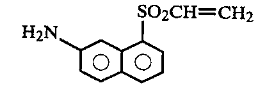 | black |
| 126 | " | " | 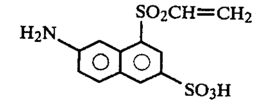 | black |
| 127 | " | " | 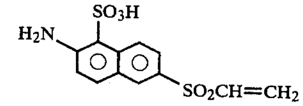 | black |
| 128 | " | " | 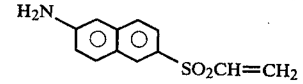 | black |
| 129 | " | 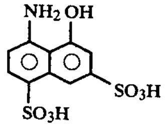 | 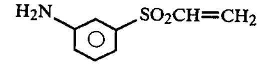 | black |
| 130 | " | " | 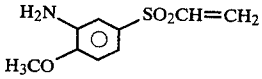 | black |
| 131 | " | " | 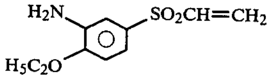 | black |
| 132 | " | " | 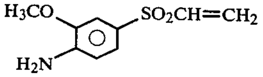 | black |
| 133 | " | " | 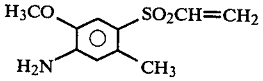 | black |
| 134 | " | " | 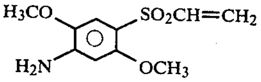 | black |
| 135 | " | " | 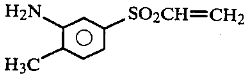 | black |
| 136 | " | " | 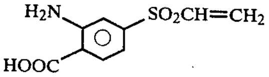 | black |
| 137 | " | " | 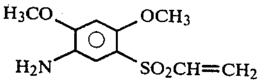 | black |

TABLE 2-continued
| Example | 1st diazo component | Coupling component | 2nd diazo component | Color shade on cotton |
|---|---|---|---|---|
| 138 | " | " | 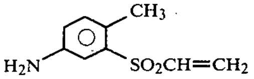 | black |
| 139 | " | " | 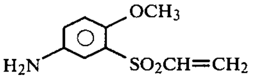 | black |
| 140 | " | " | 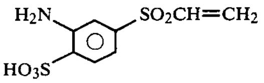 | black |
| 141 | " | " | 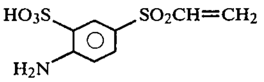 | black |
| 142 | " | " | 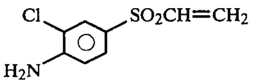 | black |
| 143 | " | " | 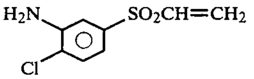 | black |
| 144 | " | " | 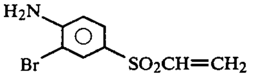 | black |
| 145 | " | " | 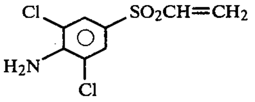 | black |
| 146 | " | " | 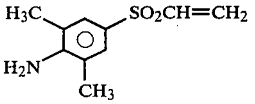 | black |
| 147 | " | " | 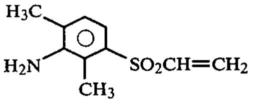 | black |
| 148 | " | " | 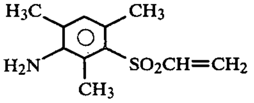 | black |
| 149 | " | " | 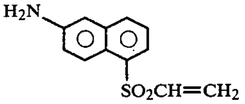 | black |
| 150 | " | " | 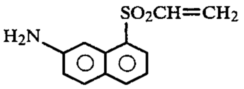 | black |
| 151 | " | " | 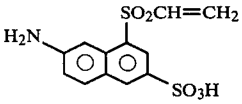 | black |
| 152 | " | " | 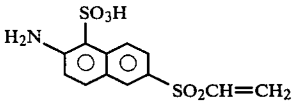 | black |
| 153 | " | " | 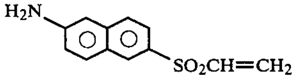 | black |
| 154 | " | 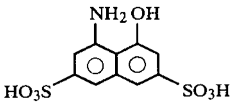 | 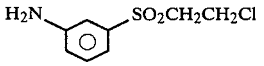 | black |

TABLE 2-continued
| Example | 1st diazo component | Coupling component | 2nd diazo component | Color shade on cotton |
|---|---|---|---|---|
| 155 | " | " | 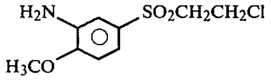 | black |
| 156 | " | " | 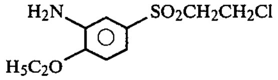 | black |
| 157 | " | " | 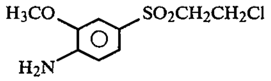 | black |
| 158 | " | " | 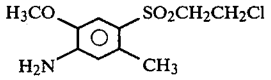 | black |
| 159 | " | " | 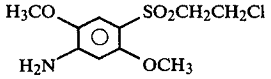 | black |
| 160 | " | " | 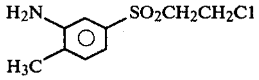 | black |
| 161 | " | " | 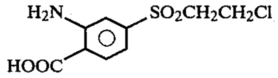 | black |
| 162 | " | " | 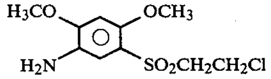 | black |
| 163 | " | " | 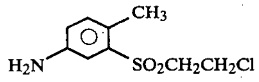 | black |
| 164 | " | " | 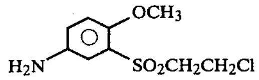 | black |
| 165 | " | " | 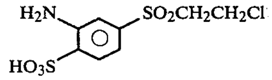 | black |
| 166 | " | " | 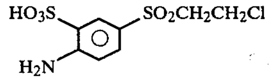 | black |
| 167 | " | " | 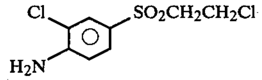 | black |
| 168 | " | " | 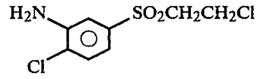 | black |
| 169 | " | " | 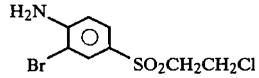 | black |
| 170 | " | " | 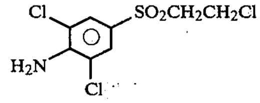 | black |
| 171 | " | " | 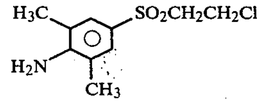 | black |
| 172 | " | " | 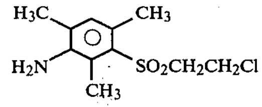 | black |
| 173 | " | " | 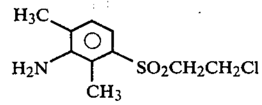 | black |

TABLE 2-continued
| Example | 1st diazo component | Coupling component | 2nd diazo component | Color shade on cotton |
|---|---|---|---|---|
| 174 | ″ | ″ | 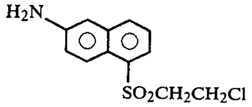 | black |
| 175 | ″ | ″ | 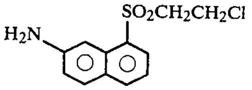 | black |
| 176 | ″ | ″ | 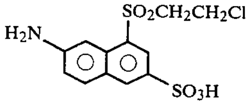 | black |
| 177 | ″ | ″ | 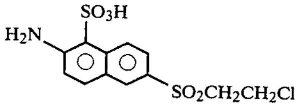 | black |
| 178 | ″ | ″ | 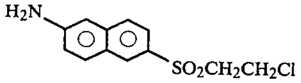 | black |
| 179 | ″ | 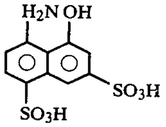 | 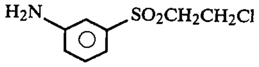 | black |
| 180 | ″ | ″ | 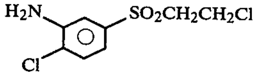 | black |
| 181 | ″ | ″ | 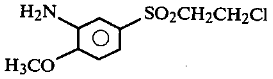 | black |
| 182 | ″ | ″ | 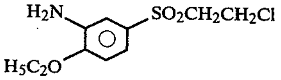 | black |
| 183 | ″ | ″ | 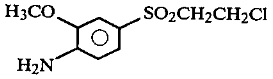 | black |
| 184 | ″ | ″ | 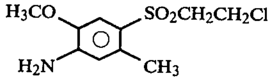 | black |
| 185 | ″ | ″ | 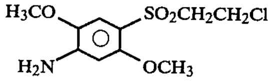 | black |
| 186 | ″ | ″ | 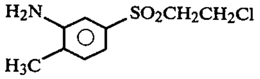 | black |
| 187 | ″ | ″ | 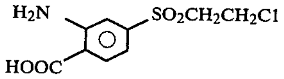 | black |
| 188 | ″ | ″ | 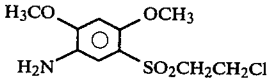 | black |
| 189 | ″ | ″ | 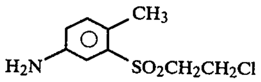 | black |
| 190 | ″ | ″ | 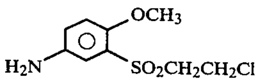 | black |
| 191 | ″ | ″ | 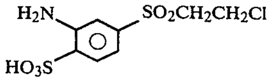 | black |
| 192 | ″ | ″ | 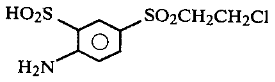 | black |

TABLE 2-continued

| Example | 1st diazo component | Coupling component | 2nd diazo component | Color shade on cotton |
|---|---|---|---|---|
| 193 | " | " | 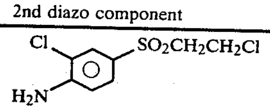 | black |
| 194 | " | " | 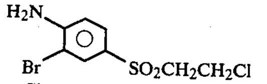 | black |
| 195 | " | " | 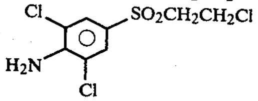 | black |
| 196 | " | " | 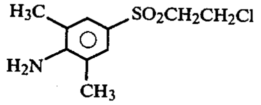 | black |
| 197 | " | " | 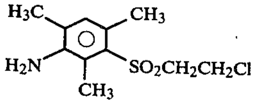 | black |
| 198 | " | " | 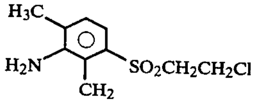 | black |
| 199 | " | " | 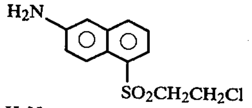 | black |
| 200 | " | " | 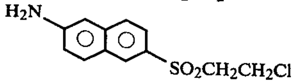 | black |
| 201 | " | " | 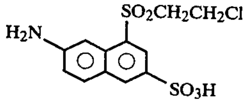 | black |
| 202 | " | " | 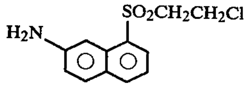 | black |
| 203 | " | " | 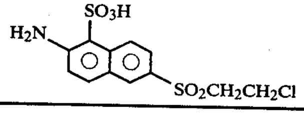 | black |

EXAMPLE 204

5.62 parts of 4-β-sulfatoethylsulfonylaniline are diazotized in 100 parts of water, 30 parts of 2 N hydrochloric acid and 100 parts of ice with 4.1 parts of 5 N sodium nitrite solution. The excess nitrite is destroyed with amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction has ended. The tetrazonium solution, prepared from: 2.48 parts of 3,3'-diaminodiphenylsulfone, 100 parts of water, 30 parts of 2 N hydrochloric acid, 50 parts of ice and 4.1 parts of 5 N sodium nitrite solution, is now added, after the excess nitrite has been removed with amidosulfonic acid, to the red dyestuff solution thus obtained. After adding 5 parts of crystalline sodium acetate, the pH value is adjusted to 5 with sodium carbonate solution. After the 2nd coupling reaction has ended, the dyestuff formed is isolated from the blue solution by spray-drying. A black powder is obtained which dissolves in water to give a blue color. When applied to cotton by the conventional processes for reactive dyestuffs, the dyestuffs, which is a single compound, (i.e. a unitary dyestuff product) gives a bluish-tinged black with very good fastness to wet processing and good fastness to light. Its color shade is a little redder than that of the dyestuff of Example 1.

EXAMPLE 205

If, in Example 204, the 6.38 parts of 1-amino-8-naphthol-3,6-disulfonic acid are replaced by 6.38 parts of 1-amino-8-naphthol-4,6-disulfonic acid and in other respects the procedure followed is the same as that described in Example 204, an isomeric dyestuff with similar properties is obtained.

EXAMPLE 206

If, in the above Examples 204 and 205, the 5.62. parts of 4-β-sulfatoethylsulfonylaniline are replaced by 5.44 parts of 4-β-thiosulfato-ethylsulfonylaniline and in other respects the procedure followed is the same as that described in these examples, similar dyestuffs with similar properties are obtained.

Polyazo dyestuffs which have similar properties can be obtained by a similar procedure by using the corresponding equimolar amounts of the substances listed in Table 3 which follows.

TABLE 3

| Example | 1st diazo component | Coupling component | 2nd diazo component | Color shade on cotton |
|---|---|---|---|---|
| 207 | 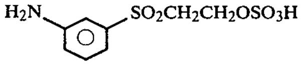 | 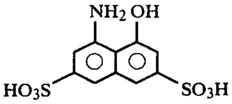 | 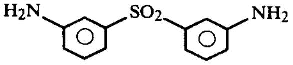 | black |
| 208 | 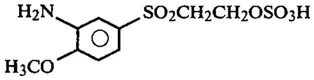 | " | " | black |
| 209 | 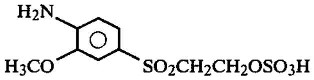 | " | " | black |
| 210 | 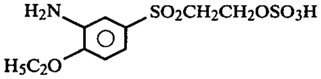 | " | " | black |
| 211 | 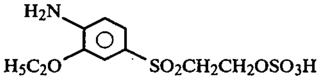 | " | " | black |
| 212 | 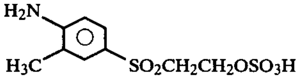 | " | 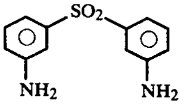 | black |
| 213 | 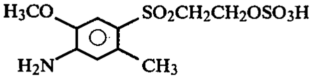 | " | " | black |
| 214 | 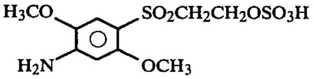 | " | " | black |
| 215 | 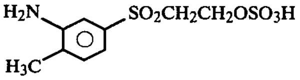 | " | " | black |
| 216 | 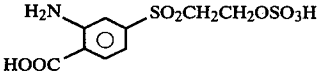 | " | " | black |
| 217 | 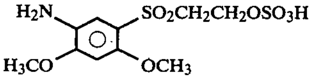 | " | " | black |
| 218 | 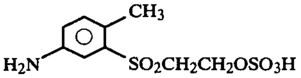 | " | " | black |
| 219 | 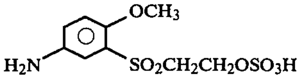 | " | " | black |
| 220 | 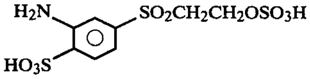 | " | " | black |
| 221 | 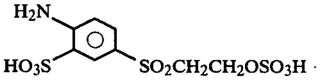 | " | " | black |
| 222 | 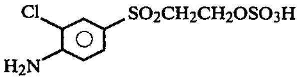 | " | " | black |
| 223 | 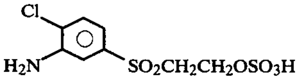 | " | " | black |
| 224 | 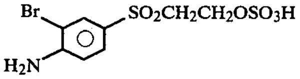 | " | " | black |
| 225 | 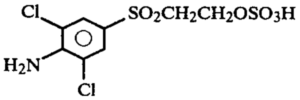 | " | " | black |

TABLE 3-continued
| Example | 1st diazo component | Coupling component | 2nd diazo component | Color shade on cotton |
|---|---|---|---|---|
| 226 | 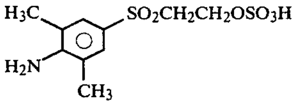 | " | " | black |
| 227 | 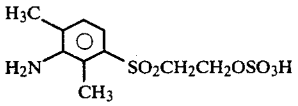 | " | " | black |
| 228 | 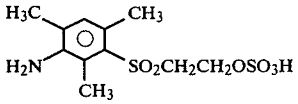 | " | " | black |
| 229 | 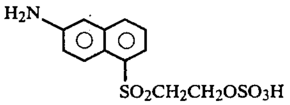 | " | " | black |
| 230 | 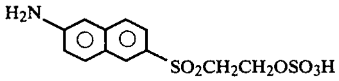 | " | " | black |
| 231 | 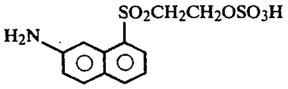 | " | " | black |
| 232 | 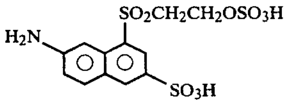 | " | " | black |
| 233 | 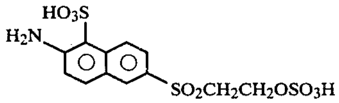 | " | " | black |
| 234 | 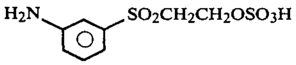 | 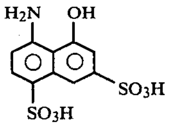 | " | black |
| 235 | 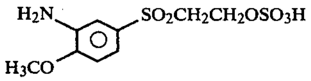 | " | " | black |
| 236 | 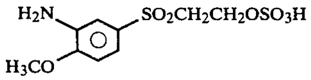 | " | " | black |
| 237 | 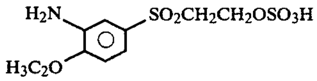 | " | " | black |
| 238 | 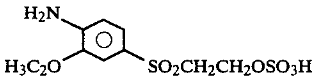 | " | " | black |
| 239 | 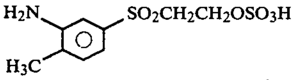 | " | " | black |
| 240 | 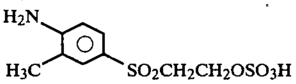 | " | " | black |
| 241 | 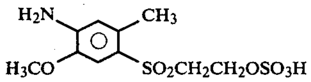 | " | " | black |
| 242 | 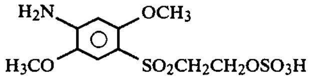 | " | " | black |
| 243 | 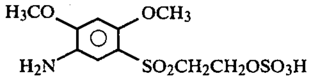 | " | " | black |

TABLE 3-continued
| Example | 1st diazo component | Coupling component | 2nd diazo component | Color shade on cotton |
|---|---|---|---|---|
| 244 | 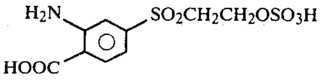 | " | " | black |
| 245 | 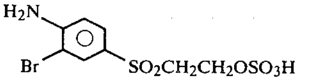 | " | " | black |
| 246 | 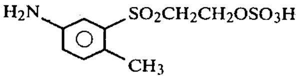 | " | " | black |
| 247 | 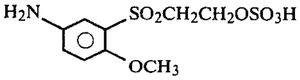 | " | " | black |
| 248 | 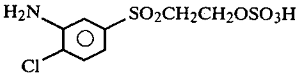 | " | " | black |
| 249 | 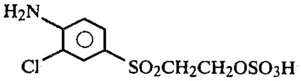 | " | " | black |
| 250 | 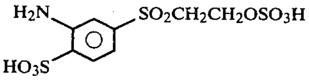 | " | " | black |
| 251 | 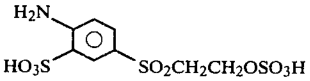 | " | " | black |
| 252 | 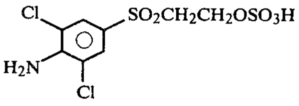 | " | " | black |
| 253 | 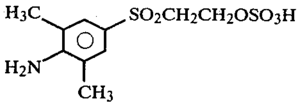 | " | " | black |
| 254 | 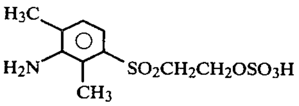 | " | " | black |
| 255 | 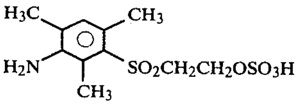 | " | " | black |
| 256 | 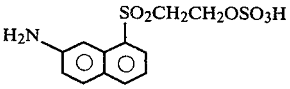 | " | " | black |
| 257 | 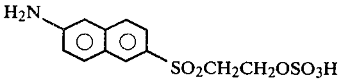 | " | " | black |
| 258 | 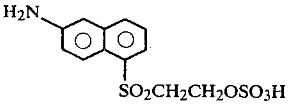 | " | " | black |
| 259 | 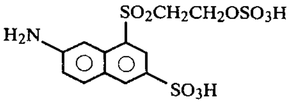 | " | " | black |
| 260 | 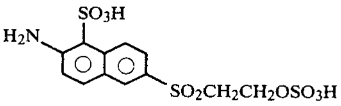 | " | " | black |
| 261 | 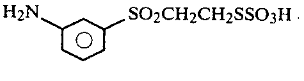 | 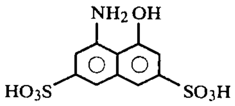 | " | black |

TABLE 3-continued
| Example | 1st diazo component | Coupling component | 2nd diazo component | Color shade on cotton |
|---|---|---|---|---|
| 262 | 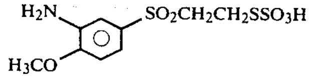 | " | " | black |
| 263 | 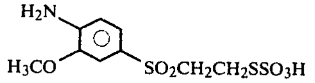 | " | " | black |
| 264 | 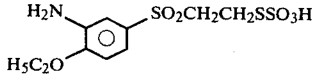 | " | " | black |
| 265 | 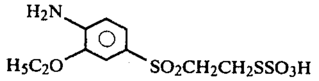 | " | " | black |
| 266 | 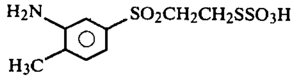 | " | " | black |
| 267 | 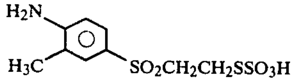 | " | " | black |
| 268 | 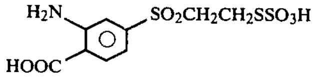 | " | " | black |
| 269 | 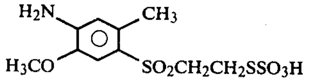 | " | " | black |
| 270 | 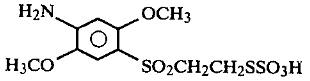 | " | " | black |
| 271 | 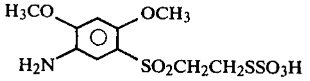 | " | " | black |
| 272 | 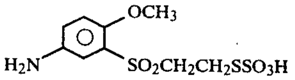 | " | " | black |
| 273 | 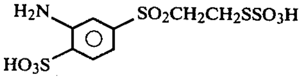 | " | " | black |
| 274 | 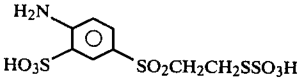 | " | " | black |
| 275 | 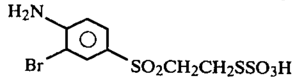 | " | " | black |
| 276 | 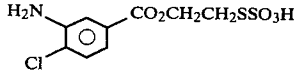 | " | " | black |
| 277 | 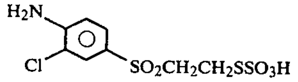 | " | " | black |
| 278 | 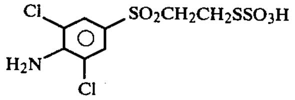 | " | " | black |
| 279 | 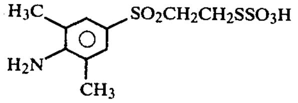 | " | " | black |
| 280 | 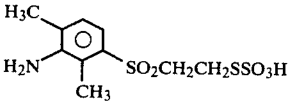 | " | " | black |
| 281 | 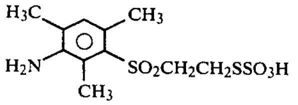 | " | " | black |

TABLE 3-continued
| Example | 1st diazo component | Coupling component | 2nd diazo component | Color shade on cotton |
|---|---|---|---|---|
| 282 | 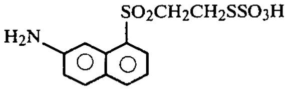 | " | " | black |
| 283 | 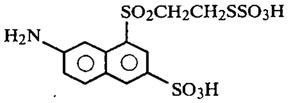 | " | " | black |
| 284 | 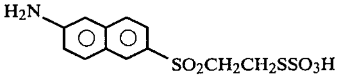 | " | " | black |
| 285 | 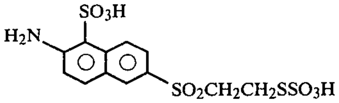 | " | " | black |
| 286 | 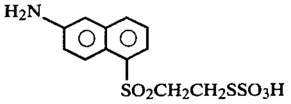 | " | " | black |
| 287 | 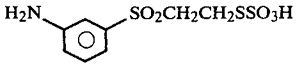 | 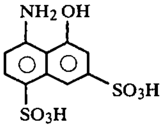 | " | black |
| 288 | 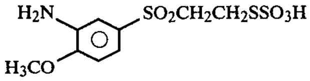 | " | " | black |
| 289 | 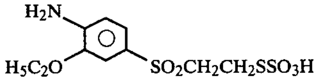 | " | " | black |
| 290 | 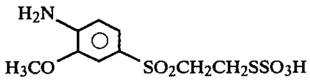 | " | " | black |
| 291 | 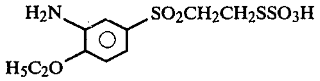 | " | " | black |
| 292 | 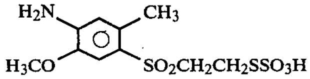 | " | " | black |
| 293 | 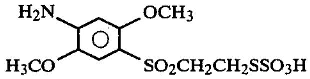 | " | " | black |
| 294 | 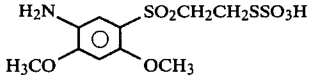 | " | " | black |
| 295 | 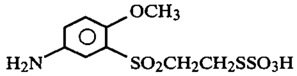 | " | " | black |
| 296 | 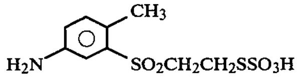 | " | " | black |
| 297 | 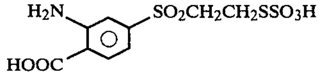 | " | " | black |
| 298 | 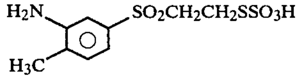 | " | " | black |
| 299 | 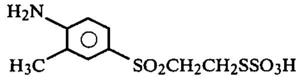 | " | " | black |
| 300 | 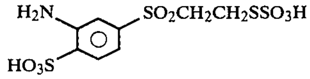 | " | " | black |

TABLE 3-continued

| Example | 1st diazo component | Coupling component | 2nd diazo component | Color shade on cotton |
|---|---|---|---|---|
| 301 | 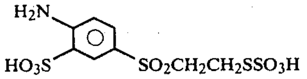 | " | " | black |
| 302 | 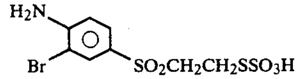 | " | " | black |
| 303 | 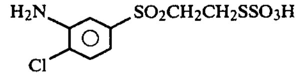 | " | " | black |
| 304 | 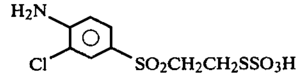 | " | " | black |
| 305 | 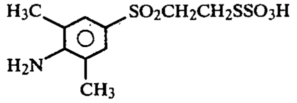 | " | " | black |
| 306 | 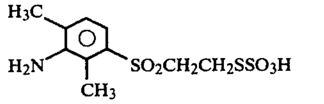 | " | " | black |
| 307 | 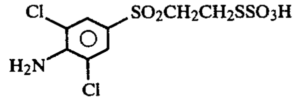 | " | " | black |
| 308 | 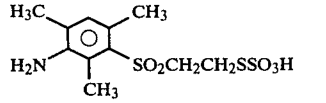 | " | " | black |
| 309 | 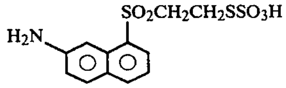 | " | " | black |
| 310 | 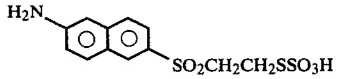 | " | " | black |
| 311 | 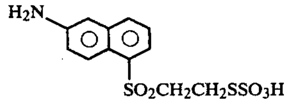 | " | " | black |
| 312 | 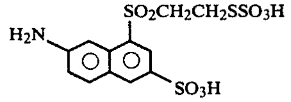 | " | " | black |
| 313 | 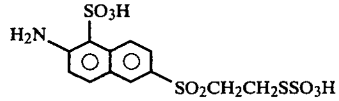 | " | " | black |

EXAMPLE 314

3.66 parts of 4-vinylsulfonylaniline are diazotized in 100 parts of water, 30 parts of 2 N hydrochloric acid and 100 parts of ice with 4.1 parts of 5 N sodium nitrite solution. The excess nitrite is removed with amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction had ended. The tetrazonium solution, prepared from 2.48 parts of 3,3'-diaminodiphenylsulfone, 100 parts of water, 30 parts of 2 N hydrochloric acid, 50 parts of ice and 4.1 parts of 5 N sodum nitrite solution is then added, after the excess nitrite has been removed with amidosulfonic acid. After adding 5 parts of sodium acetate, the pH value is adjusted to 5–6 with sodium carbonate solution. After the coupling reaction has ended, the dyestuff formed is isolated by precipitating with potassium chloride. It is filtered off and washed with potassium chloride solution and dried in vacuo at 50°–70° C. A dark powder is obtained which dissolves in water to give a blue color. When applied to cotton by conventional processes for reactive dyestuffs and fixed with sodium carbonate, sodium hydroxide solution or sodium bicarbonate, the dyestuff, which is a single compound (i.e. a unitary product), gives a bluish-tinged black with very good fastness properties to wet processing and good fastness to light.

EXAMPLE 315

If, in Example 314, the 6.38 parts of 1-amino-8-naphthol-3,6-disulfonic acid are replaced by 6.38 parts of 1-amino-8-naphthol-4,6-disulfonic acid and the procedure followed is the same as that described in Example 314, an isomeric dyestuff with similar properties is obtained.

EXAMPLE 316

If, in Examples 314 and 315, the 3.66 parts of 4-vinylsulfonylaniline are replaced by 4.39 parts of 4-β-chloroethylsulfonylaniline and in other respects the procedure followed is the same as that described in Example 299, dyestuffs with similar properties are obtained.

Dyestuffs which have similar properties can be obtained in a similar manner by using the corresponding equimolar amounts of the substances listed in Table 4 which follows.

TABLE 4

| Example | 1st diazo component | Coupling component | 2nd diazo component | Color shade on cotton |
|---|---|---|---|---|
| 317 | 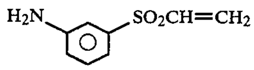 | 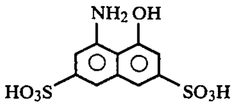 | 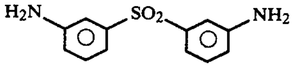 | black |
| 318 | 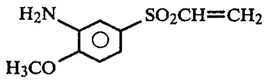 | " | " | black |
| 319 | 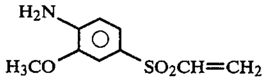 | " | " | black |
| 320 | 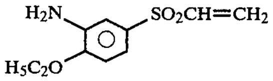 | " | " | black |
| 321 | 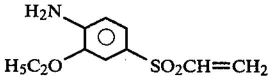 | " | " | black |
| 322 | 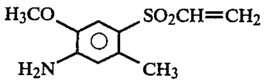 | " | " | black |
| 323 | 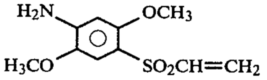 | " | " | black |
| 324 | 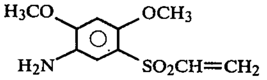 | " | " | black |
| 325 | 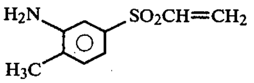 | " | " | black |
| 326 | 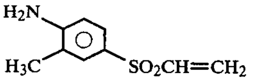 | " | " | black |
| 327 | 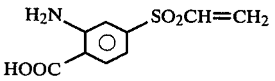 | " | " | black |
| 328 | 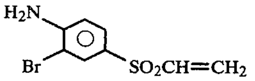 | " | " | black |
| 329 | 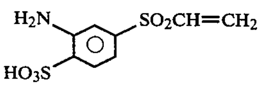 | " | " | black |
| 330 | 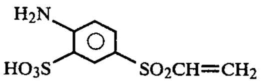 | " | " | black |
| 331 | 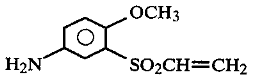 | " | " | black |
| 332 | 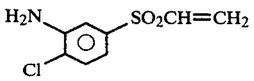 | " | " | black |
| 333 | 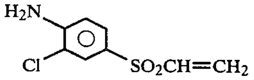 | " | " | black |

TABLE 4-continued
| Example | 1st diazo component | Coupling component | 2nd diazo component | Color shade on cotton |
|---|---|---|---|---|
| 334 | 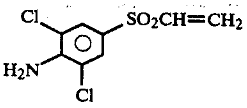 | " | " | black |
| 335 | 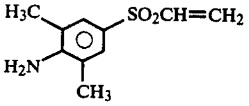 | " | " | black |
| 336 | 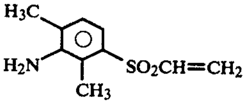 | " | " | black |
| 337 | 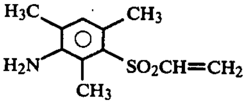 | " | " | black |
| 338 | 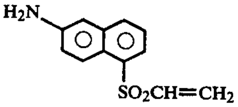 | " | " | black |
| 339 | 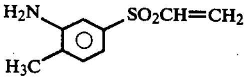 | " | " | black |
| 340 | 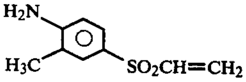 | " | " | black |
| 341 | 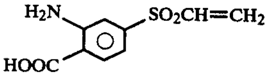 | " | " | black |
| 342 | 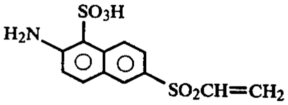 | " | " | black |
| 343 | 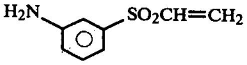 | 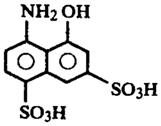 | " | black |
| 344 | 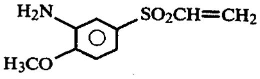 | " | " | black |
| 345 | 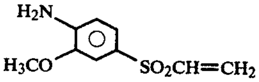 | " | " | black |
| 346 | 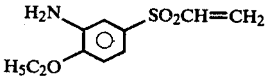 | " | " | black |
| 347 | 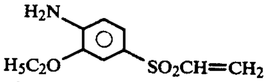 | " | " | black |
| 348 | 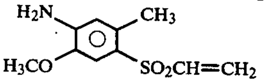 | " | " | black |
| 349 | 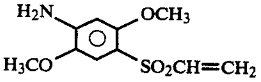 | " | " | black |
| 350 | 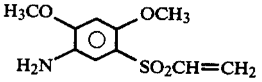 | " | " | black |
| 351 | 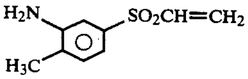 | " | " | black |

TABLE 4-continued
| Example | 1st diazo component | Coupling component | 2nd diazo component | Color shade on cotton |
|---|---|---|---|---|
| 352 | 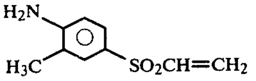 | " | " | black |
| 353 | 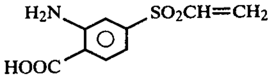 | " | " | black |
| 354 | 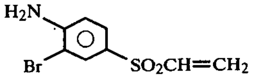 | " | " | black |
| 355 | 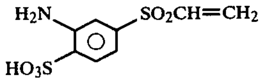 | " | " | black |
| 356 | 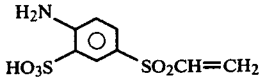 | " | " | black |
| 357 | 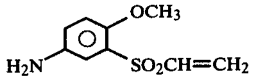 | " | " | black |
| 358 | 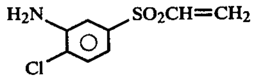 | " | " | black |
| 359 | 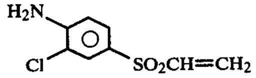 | " | " | black |
| 360 | 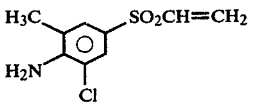 | " | " | black |
| 361 | 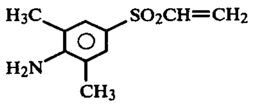 | " | " | black |
| 362 | 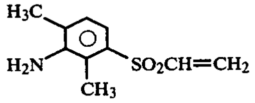 | " | " | black |
| 363 | 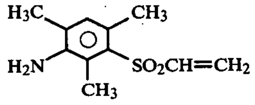 | " | " | black |
| 364 | 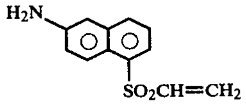 | " | " | black |
| 365 | 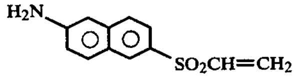 | " | " | black |
| 366 | 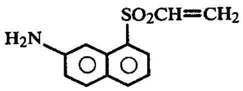 | " | " | black |
| 367 | 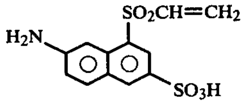 | " | " | black |
| 368 | 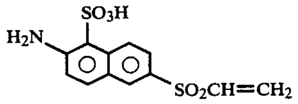 | " | " | black |
| 369 | 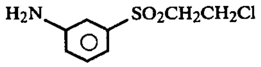 | 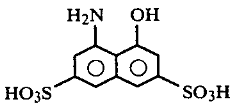 | " | black |

TABLE 4-continued
| Example | 1st diazo component | Coupling component | 2nd diazo component | Color shade on cotton |
|---|---|---|---|---|
| 370 | 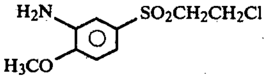 | " | " | black |
| 371 | 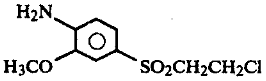 | " | " | black |
| 372 | 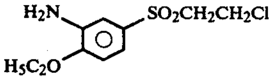 | " | " | black |
| 373 | 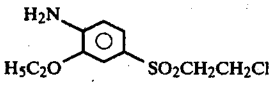 | " | " | black |
| 374 | 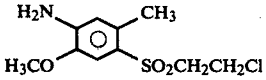 | " | " | black |
| 375 | 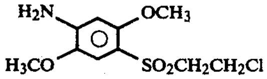 | " | " | black |
| 376 | 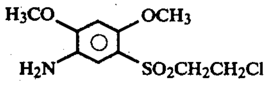 | " | " | black |
| 377 | 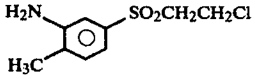 | " | " | black |
| 378 | 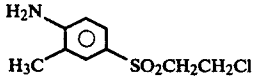 | " | " | black |
| 379 | 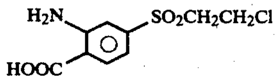 | " | " | black |
| 380 | 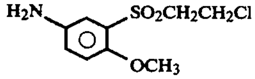 | " | " | black |
| 381 | 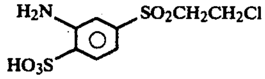 | " | " | black |
| 382 | 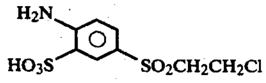 | " | " | black |
| 383 | 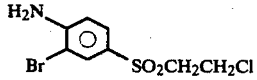 | " | " | black |
| 384 | 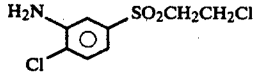 | 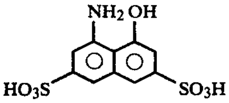 | " | black |
| 385 | 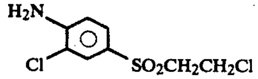 | " | " | black |
| 386 | 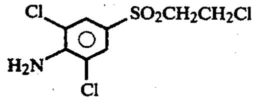 | " | " | black |
| 387 | 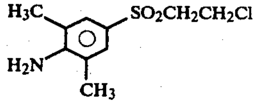 | " | " | black |
| 388 | 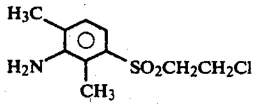 | " | " | black |

TABLE 4-continued
| Example | 1st diazo component | Coupling component | 2nd diazo component | Color shade on cotton |
|---|---|---|---|---|
| 389 | 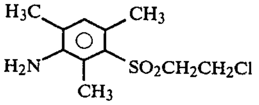 | " | " | black |
| 390 | 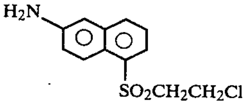 | " | " | black |
| 391 | 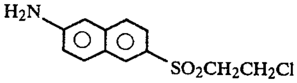 | " | " | black |
| 392 | 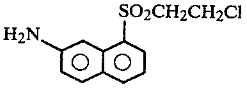 | " | " | black |
| 393 | 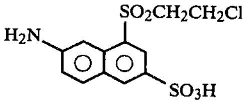 | " | " | black |
| 394 | 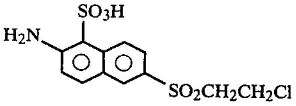 | " | " | black |
| 395 | 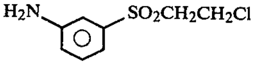 | 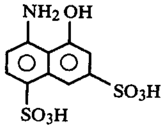 | " | black |
| 396 | 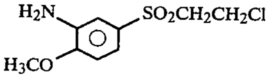 | " | " | black |
| 397 | 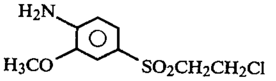 | " | " | black |
| 398 | 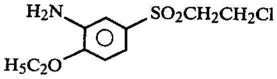 | " | " | black |
| 399 | 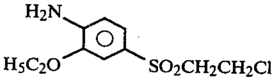 | " | " | black |
| 400 | 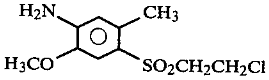 | " | " | black |
| 401 | 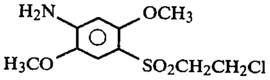 | " | " | black |
| 402 | 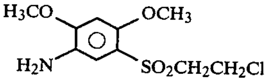 | " | " | black |
| 403 | 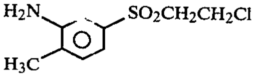 | " | " | black |
| 404 | 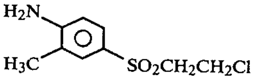 | " | " | black |
| 405 | 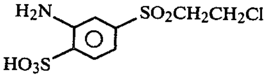 | " | " | black |
| 406 | 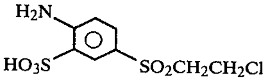 | " | " | black |
| 407 | 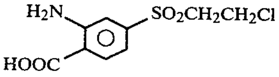 | " | " | black |

TABLE 4-continued

| Example | 1st diazo component | Coupling component | 2nd diazo component | Color shade on cotton |
|---|---|---|---|---|
| 408 | 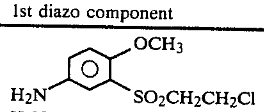 | " | " | black |
| 409 | 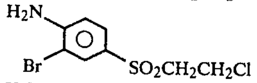 | " | " | black |
| 410 | 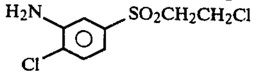 | " | " | black |
| 411 | 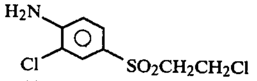 | " | " | black |
| 412 | 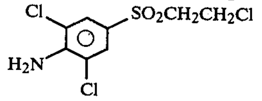 | " | " | black |
| 413 | 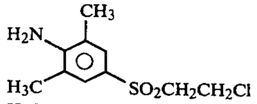 | " | " | black |
| 414 | 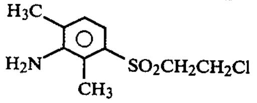 | " | " | black |
| 415 | 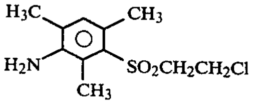 | " | " | black |
| 416 | 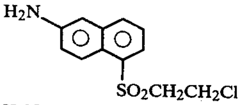 | " | " | black |
| 417 | 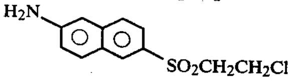 | " | " | black |
| 418 | 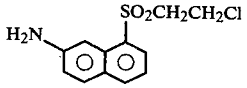 | " | " | black |
| 419 | 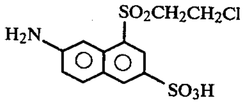 | " | " | black |
| 420 | 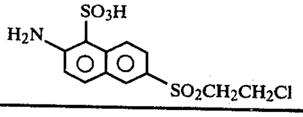 | " | " | black |

EXAMPLE 421

2.48 parts of 4,4'-diaminodiphenylsulfone are diazotized in 100 parts of water, 30 parts of 2 N hydrochloric acid and 50 parts of ice with 4.1 parts of 5 N sodium nitrite solution. The excess nitrite is destroyed with a little amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction has ended. A diazonium solution prepared from 5.62 parts of 4-β-sulfatoethylsulfonylaniline, 100 parts of water, 30 parts of 2 N hydrochloric acid, 100 parts of ice and 4.1 parts of 5 N sodium nitrite solution is added, after the excess nitrite has been destroyed with amidosulfonic acid, to the red dyestuff solution thus obtained. 5 parts of crystalline sodium acetate are added and the pH value is adjusted to 4.5–5 with 10% strength sodium carbonate solution. After the coupling reaction has ended, a blue dye-stuff solution is obtained. The dyestuff is isolated by spray-drying. When used to dye or print cotton in the presence of acid-binding agents by conventional processes, a black dyeing or print with very good fastness properties to wet processing and good fastness to light is obtained.

Dyestuffs which have similarly good properties can be obtained by a similar procedure by using, as the second diazo component, the 2nd diazo components listed under Example 3 to 26 and 51 to 75 in Table 1, in place of 4-β-sulfatoethylsulfonylaniline.

EXAMPLE 422

If, in the above Example 421, the 6.39 parts of 1-amino-8-naphthol-3,6-disulfonic acid are replaced by 6.38 parts of 1-amino-8-naphthol-4,6-disulfonic acid and in other respects the procedure is the same as that described above, a dyestuff with similar properties is obtained.

Dyestuffs with similarly good properties can be obtained by a similar procedure by using, as the second diazo component, the 2nd diazo components listed under Example 27 to 50 and 76 to 100 in Table 1.

EXAMPLE 423

2.48 parts of 4,4'-diaminodiphenylsulfone are diazotized in 100 parts of water, 30 parts of 2 N hydrochloric acid and 50 parts of ice with 4.1 parts of 5 N sodium nitrite solution. The excess nitrite is removed with amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction has ended. A diazonium solution prepared from 3.66 parts of 4-vinylsulfonylaniline, 100 parts of water, 30 parts of 2 N hydrochloric acid, 100 parts of ice and 4.1 parts of 5 N sodium nitrite solution is now added, after the excess nitrite has been destroyed with amidosulfonic acid. 5 parts of crystalline sodium acetate are added and the pH value is adjusted to 4.5–5 with 10% strength sodium carbonate solution. After the coupling reaction has ended, the dyestuff is precipitated with potassium chloride, filtered off and washed with potassium chloride solution. After drying in vacuo at 50°–60° C., a dark powder is obtained which dissolves in water to give a blue color. On cotton, dyeings and prints in black shades with very good fastness properties to wet processing and good fastness to light are obtained by conventional processes in the presence of acid-binding agents.

Dyestuffs which have similarly good properties can be obtained by a similar procedure by using, as the second diazo component in Example 423, the 2nd diazo components listed under Example 104 to 128 and 154 to 178 in Table 2, in place of the vinylsulfonylaniline.

EXAMPLE 424

If the 6.38 parts of 1-amino-8-naphthol-3,6-disulfonic acid in Example 423 are replaced by 6.38 parts of 1-amino-8-naphthol-4,6-disulfonic acid and in other respects the procedure is the same as that described in Example 423, a dyestuff with similar properties is obtained.

Dyestuffs with similarly good properties can be obtained by a similar procedure by using, as the second diazo component, the second diazo components listed under Example 129 to 153 and 176 to 203 in Table 2.

EXAMPLE 425

If, in the above Examples 423 and 424, the 3.66 parts of 4-vinylsulfonylaniline are replaced by 4.39 parts of 4-β-chloroethylsulfonylaniline and in other respects the procedure followed is the same as that described in these examples, dyestuffs with similar properties are obtained.

EXAMPLE 426

5.62 parts of 4-β-sulfatoethylsulfonylaniline are diazotized in 100 parts of water, 30 parts of 2 N hydrochloric acid and 100 parts of ice with 4.1 parts of 5 N sodium nitrite solution. The excess nitrite is destroyed with amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction has ended. A tetrazonium solution prepared from 2.48 parts of 4,4'-diaminodiphenylsulfone, 100 parts of water, 30 parts of 2 N hydrochloric acid, 50 parts of ice and 4.1 parts of 5 N sodium nitrite solution is now added, after the excess nitrite has been removed with amidosulfonic acid, to this dyestuff solution. After adding 5 parts of crystalline sodium acetate, the pH value is adjusted to 5 with 10% strength sodium carbonate solution. After the 2nd coupling reaction has ended, the dyestuff formed is isolated by spray-drying. A dark powder is obtained which dissolves in water to give a blue color. When applied to cotton by conventional processes in the presence of substances having an alkaline reaction, the dyestuff, which is a single substance, gives a black with very good fastness properties to wet processing and good fastness to light.

Black dyestuffs which have similarly good properties can be obtained by a similar procedure by using, as the first diazo component in Example 426, the 1st diazo components listed under Example 207 to 233 and 261 to 286 in Table 3, in place of 4-β-sulfatoethylsulfonylaniline.

EXAMPLE 427

If, in the above Example 426, the 6.38 parts of 1-amino-8-naphthol-3,6-disulfonic acid are replaced by 6.38 parts of 1-amino-8-naphthol-4,6-disulfonic acid and in other respects the procedure followed is the same as that described in Example 426, a dyestuff with similar properties is obtained. Black dyestuffs which have similarly good properties can be obtained by a similar procedure by using, as the first diazo component in Example 427, the 1st diazo components listed under Example 234 and 260 and 287 to 313 in Table 3, in place of 4-β-sulfatoethylsulfonylaniline.

EXAMPLE 428

If, in Examples 426 and 427, the 5.62 parts of 4-β-sulfatoethylsulfonylaniline are replaced by 5.94 parts of 4-β-thiosulfatoethylsulfonylaniline and in other respects the procedure followed is the same as that described in these examples, similar dyestuffs with similar properties are obtained.

EXAMPLE 429

3.66 parts of 4-vinylsulfonylaniline are diazotized in 100 parts of water, 30 parts of 2 N hydrochloric acid and 100 parts of ice with 4.1 parts of 5 N sodium nitrite solution. The excess nitrite is removed with amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction has ended. The tetrazonium solution, prepared from 2.48 parts of 4,4'-diaminodiphenylsulfone, 100 parts of water, 30 parts of 2 N hydrochloric acid, 50 parts of ice and 4.1 parts of 5 N sodium nitrite solution is then added, after the excess nitrite has been removed with amidosulfonic acid. After adding 5 parts of crystalline sodium acetate, the pH value is adjusted to 5–6 with sodium carbonate solution. After the coupling reaction has ended, the dyestuff formed is isolated by precipitating with potassium chloride. It is filtered off and washed with potassium chloride solution. The dyestuff is dried in vacuo at 50°–70° C. This gives a dark powder which dissolves in water to give a blue color. When dyed or printed on cotton in the presence of alkalis by conventional processes for reactive dyestuffs, the dyestuff, which is a single compound, gives a black with very good fastness properties to wet processing and good fastness to light.

Black dyestuffs which have similarly good properties can be obtained by a similar procedure by using, as the first diazo component in Example 429, the 1st diazo components listed under Example 317 to 342 and 369 to 394 in Table 4, in place of the 4-vinylsulfonylaniline.

EXAMPLE 430

If, in Example 429, 6.38 parts of 1-amino-8-naphthol-4,6-disulfonic acid are used in place of the 6.38 parts of 1-amino-8-naphthol-3,6-disulfonic acid employed in that example, and in other respects the procedure followed is the same as that described in Example 429, a dyestuff with similar properties is obtained.

Black dyestuffs which have similarly good properties can be obtained by a similar procedure by using, as the first diazo component in Example 430, the 1st diazo components listed under Example 343 to 368 and 395 to 420 in Table 4, in place of the 4-vinylsulfonylaniline.

EXAMPLE 431

If, in Examples 429 and 430, the 3.66 parts of 4-vinylsulfonylaniline are replaced by 4.39 parts of 4-β-chloroethylsulfonylaniline and in other respects the procedure is the same as that described in Example 429, dyestuffs with similar properties are obtained.

EXAMPLE 432

3.7 parts of 4,4'-diaminostilbene-2,2'-disulfonic acid are dissolved in 100 parts of water with 10 parts of 2 N sodium hydroxide solution to give a neutral solution, 4 parts of 5 N sodium nitrite solution are added and the mixture is then stirred into a mixture of 30 parts of 2 N hydrochloric acid, 100 parts of water and 50 parts of ice and 0.5 part of 5 N sodium nitrite solution. After the diazotization has ended, the excess nitrite is removed with amidosulfonic acid. A neutral solution of 6.38 parts of 1-amino-8-naphthol-3,6-disulfonic acid and 10 parts of 2 N sodium hydroxide solution in 400 parts of water is added slowly to this diazonium solution. The mixture is stirred until the coupling reaction has ended. The diazo solution prepared from 5.62 parts of 4-β-sulfatoethylsulfonylaniline, 100 parts of water, 30 parts of 2 N hydrochloric acid, 100 parts of ice and 4.1 parts of 5 N sodium nitrite solution is added, after the excess nitrite has been destroyed with amidosulfonic acid, to this reaction mixture. After adding 5 parts of crystalline sodium acetate, the pH value is adjusted to 4.5–5 with 10% strength sodium carbonate solution. After the coupling reaction has ended, the blue dyestuff formed is precipitated with potassium chloride, filtered off and washed with dilute potassium chloride solution. It is dried at 50°–70° C. in vacuo. The dyestuff is a dark powder. It dissolves in water to give a greenish-tinged blue color. When applied to cotton by conventional processes for reactive dyestuffs, in the presence of an acid-binding agent, it gives greenish-tinged black dyeings and prints with very good fastness properties to wet processing and good fastness to light.

Black dyestuffs which have similarly good properties can be obtained by a similar procedure by using, as the second diazo component in Example 432, the 2nd diazo components listed under Example 3 to 26 and 51 to 75 in Table 1, in place of the 4-β-sulfatoethylsulfonylaniline.

EXAMPLE 433

If, in the above Example 432, the 6.38 parts of 1-amino-8-naphthol-3,6-disulfonic acid are replaced by 6.38 parts of 1-amino-8-naphthol-4,6-disulfonic acid and in other respects the procedure followed is the same as that described in Example 432, a dyestuff with similar properties is obtained.

Black dyestuffs which have similarly good properties can be obtained by a similar procedure by using, as the second diazo component in Example 433, the 2nd diazo components listed under Example 27 to 50 and 76 to 100 in Table 1, in place of the 4-β-sulfatoethylsulfonylaniline.

EXAMPLE 434

If, in Examples 432 and 433, the 5.62 parts of 4-β-sulfatoethylsulfonylaniline are replaced by 5.94 parts of 4-β-thiosulfatoethylsulfonylaniline and the procedure followed is the same as that described in the said examples, similar dyestuffs with similar properties are obtained.

EXAMPLE 435

5.62 parts of 4-β-sulfatoethylsulfonylaniline are diazotized in 100 parts of water, 30 parts of 2 N hydrochloric acid and 100 parts of ice with 4.1 parts of 5 N sodium nitrite solution. The excess nitrite is destroyed with amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction has ended. A tetrazo suspension is prepared: 3.7 parts of 4,4'-diaminostilbene-2,2'-disulfonic acid are dissolved in 100 parts of water with 10 parts of 2 N sodium hydroxide solution to give a neutral solution, and 4 parts of 5 N sodium nitrite solution are added; this solution is stirred into a mixture of 30 parts of 2 N hydrochloric acid, 100 parts of water, 50 parts of ice and 0.5 part of 5 N sodium nitrite solution. After the diazotization has ended, the excess nitrite is removed with amidosulfonic acid. This tetrazo suspension is added to the red dyestuff solution obtained, thereafter 5 parts of crystalline sodium acetate, and the pH value is adjusted to 6 with 10% strength sodium carbonate solution. After the coupling reaction has ended, the dyestuff formed is precipitated with potassium chloride, filtered off and washed with dilute potassium chloride solution. It is dried in vacuo at 50°–70° C. It is a dark powder which dissolves in water to give a greenish-tinged blue color. When applied to cotton in the presence of an acid-binding agent by conventional processes for reactive dyestuffs, this dye-stuff gives greenish-tinged black dyeings or prints with very good fastness properties to wet processing and good fastness to light.

Black dyestuffs which have similarly good properties can be obtained by a similar procedure by using, as the first diazo component in Example 435, the 1st diazo components listed under Example 207–233 and 261 to 286 in Table 3, in place of the 4-β-sulfatoethylsulfonylaniline.

EXAMPLE 436

If, in the above Example 435, the 6.38 parts of 1-amino-8-naphthol-3,6-disulfonic acid are replaced by 6.38 parts of 1-amino-8-naphthol-4,6-disulfonic acid and in other respects the procedure followed is the same as that described in Example 435, a similar dyestuff with similar properties is obtained.

Black dyestuffs which have similarly good properties can be obtained by a similar procedure by using, as the first diazo component in Example 436, the 1st diazo components listed under Example 234 to 260 and 287 to 313 in Table 3, in place of the 4-β-sulfatoethylsulfonylaniline.

EXAMPLE 437

If, in Examples 435 and 436, the 5.62 parts of 4-β-sulfatoethylsulfonylaniline are replaced by 5.94 parts of 4-β-thiosulfatoethylsulfonylaniline and in other respects the procedure followed is the same as that described in the said examples, dyestuffs with similar properties are obtained.

EXAMPLE 438

3.7 parts of 4,4'-diaminostilbene-2,2'-disulfonic acid are dissolved in 100 parts of water with 10 parts of 2 N sodium hydroxide solution to give a neutral solution, 4.1 parts of 5 N sodium nitrite solution are added and the mixture is then stirred into a mixture of 30 parts of 2 N hydrochloric acid, 100 parts of water, 50 parts of ice and 0.5 part of 5 N sodium nitrite solution. After the diazotization has ended, the excess nitrite is destroyed with amidosulfonic acid. A neutral solution of 6.38 parts of 1-amino-8-naphthol-3,6-disulfonic acid and 10 parts of 2 N sodium hydroxide solution in 400 parts of water is added slowly to this diazonium solution. The mixture is stirred until the coupling reaction has ended. The diazo solution prepared from 3.66 parts of 4-vinylsulfonylaniline, 100 parts of water, 30 parts of 2 N hydrochloric acid, 100 parts of ice and 4.1 parts of 5 N sodium nitrite solution is added, after the excess nitrite has been removed with amidosulfonic acid, to the reaction mixture. After adding 5 parts of crystalline sodium acetate, the dyestuff formed is precipitated with potassium chloride, filtered off and washed with dilute potassium chloride solution. It is dried in vacuo at 50°–60° C. The dyestuff is a dark powder which dissolves in water to give a greenish-tinged blue color. When applied to cotton by conventional processes for reactive dyestuffs in the presence of acid-binding agents it gives greenish-tinged black dyeings or prints with very good fastness properties to wet processing and good fastness to light.

Black dyestuffs which have similarly good properties can be obtained by a similar procedure by using, as the second diazo component in Example 438, the 2nd diazo components listed under Example 104–128 and 154 to 178 in Table 2, in place of the 4-vinylsulfonylaniline.

EXAMPLE 439

If, in the above Example 438, the 6.38 parts of 1-amino-8-naphthol-3,6-disulfonic acid are replaced by 6.38 parts of 1-amino-8-naphthol-4,6-disulfonic acid and in other respects the procedure followed is the same as that described in the said example, a dyestuff with similar properties is obtained.

Black dyestuffs which have similarly good properties can be obtained by a similar procedure by using, as the second diazo component in Example 439, the 2nd diazo components listed under Example 129 to 153 and 179 to 203 in Table 2, in place of the 4-vinylsulfonylaniline.

EXAMPLE 440

If, in Examples 438 and 439, the 3.66 parts of 4-vinylsulfonylaniline used in these examples are replaced by 4.39 parts of 4-β-chloroethylsulfonylaniline and in other respects the procedure followed is the same as that described in the said examples, similar dyestuffs with similar properties are obtained.

EXAMPLE 441

3.66 parts of 4-vinylsulfonylaniline are diazotized in 100 parts of water, 30 parts of 2 N hydrochloric acid and 100 parts of ice with 4.1 parts of 5 N sodium nitrite solution. The excess nitrite is destroyed with amidosulfonic acid. A suspension of 6.38 parts of 1-amino-8-naphthol-3,6-disulfonic acid in 400 parts of water and 100 parts of ice is added to this diazonium solution. The mixture is stirred until the coupling reaction has ended. A tetrazonium suspension is then added, which had been prepared from 3.7 parts of 4,4'-diaminostilbene-2,2'-disulfonic acid, dissolved in 100 parts of water with 10 parts of 2 N sodium hydroxide solution to give a neutral solution, to which 4.0 parts of 5 N sodium nitrite solution have been added, and this mixed solution has then been stirred into a mixture of 30 parts of 2 N hydrochloric acid, 100 parts of water, 50 parts of ice and 0.5 part of 5 N sodium nitrite solution, the excess nitrite having been destroyed with amidosulfonic acid after diazotization. 5 parts of crystalline sodium acetate are added to that coupling mixture, and the pH value is adjusted to 6 with 10% strength sodium carbonate solution. After the coupling reaction has ended, the dyestuff formed is precipitated with potassium chloride, filtered off and washed with dilute potassium chloride solution. It is dried in vacuo at 50°–60° C. It is a dark powder which dissolves in water to give a greenish-tinged blue color. When applied to cotton in the presence of acid-binding agents by conventional processes for reactive dyestuffs, it gives greenish-tinged black dyeings or prints with very good fastness properties to wet processing and good fastness to light.

Black dyestuffs which have similarly good properties can be obtained by a similar procedure by using, as the first diazo component in Example 441, the 1st diazo components listed under Example 317 to 342 and 369 to 394 in Table 4, in place of the 4-vinylsulfonylaniline.

EXAMPLE 442

If, in the above Example 441, the 6.38 parts of 1-amino-8-naphthol-3,6-disulfonic acid are replaced by 6.38 parts of 1-amino-8-naphthol-4,6-sulfonic acid and in other respects the procedure followed is the same as that described in Example 441, a similar dyestuff with similar properties is obtained.

Black dyestuffs which have similarly good properties can be obtained by a similar procedure by using, as the first diazo component in Example 442, the 1st diazo components listed under Example 343 to 368 and 395 to 420 in Table 4, in place of the 4-vinylsulfonylaniline.

EXAMPLE 443

If, in Examples 441 and 442, the 3.66 parts of 4-vinylsulfonylaniline are replaced by 4.39 parts of 4-β-chloroethylsulfonylaniline and in other respects the procedure followed is the same as that described in the said examples, dyestuffs with similar properties are obtained.

EXAMPLE 444

If 5 parts of anhydrous disodium phosphate are added to the blue dyestuff solution obtained according to Example 1 and the solution is titrated with concentrated sodium hydroxide solution until the pH value is 12.5, the resulting mixture is stirred for 10 minutes and the pH value is then adjusted back to 4.5-5 with concentrated hydrochloric acid, the vinylsulfone dyestuff formed can be precipitated with potassium chloride. The precipitate is filtered off and washed with potassium chloride solution. After drying at 50°-60° C. in vacuo, a dark dyestuff powder is obtained which dissolves in water to give a blue color. When applied to cotton in the presence of alkalis by conventional processes for reactive dyestuffs, this dyestuff gives black dyeings or prints with very good fastness properties to wet processing and good fastness to light. The dyestuff is identical to that of Example 101.

The ester dyestuffs of Examples 2-50 can be converted to the corresponding vinylsulfone dyestuffs of Examples 101-153 in the same way.

EXAMPLE 445

If 5 parts of anhydrous disodium phosphate are added to the blue dyestuff solution obtainable according to Example 204 and the mixture is then titrated with concentrated sodium hydroxide solution until the pH value is 12.5, the resulting mixture is stirred for 10 minutes and concentrated hydrochloric acid is then added until the pH value is 4.5-5.0, the vinylsulfone dyestuff formed can be precipitated with potassium chloride. The precipitate is filtered off and washed with potassium chloride solution. After drying in vacuo at 50°-60° C., a dyestuff powder is obtained which is identical to that of Example 314.

The vinylsulfone dyestuffs of Examples 315 to 368, corresponding to the ester dyestuffs of Examples 205 to 260, can be prepared from the said ester dyestuffs in the same way.

EXAMPLE 446

If 5 parts of anhydrous disodium phosphate are added to the blue dyestuff solution obtained according to Example 421 and the pH value is adjusted to 12.5 with concentrated sodium hydroxide solution, the mixture is stirred for 10 minutes and concentrated hydrochloric acid is then added until the pH is 4.5-5.0, the resulting vinylsulfone dyestuff can be precipitated with potassium chloride. The precipitate is filtered off and washed with potassium chloride solution. After drying in vacuo at 50°-60° C., a dark powder is obtained which is identical to that of Example 423.

EXAMPLE 447

If 5 parts of anhydrous disodium phosphate are added to the blue dyestuff solution obtained according to Example 426 and the mixture is titrated with concentrated sodium hydroxide solution until the pH value is 12.5, the resulting mixture is stirred for 10 minutes and concentrated hydrochloric acid is then added until the pH value is 4.5-5.0, the resulting vinylsulfone dyestuff can be precipitated with potassium chloride. The precipitate is filtered off and washed with potassium chloride solution. It is dried in vacuo at 50°-60° C. The dyestuff thus obtained is identical to that of Example 429.

EXAMPLE 448

If 5 parts of anhydrous disodium phosphate are added to the blue dyestuff solution obtained according to Example 432 after the coupling reaction has ended and the resulting mixture is titrated with concentrated sodium hydroxide solution until the pH value is 12.5 and, after 10 minutes, concentrated hydrochloric acid is added until the pH value is 4.5-5.0, the resulting vinylsulfone dyestuff is precipitated on adding potassium chloride. The precipitate is filtered off and washed with potassium chloride solution. It is dried in vacuo at 50°-60° C. This dyestuff is identical to the dyestuff of Example 438.

EXAMPLE 449

If 5 parts of anhydrous disodium phosphate are added to the dyestuff solution obtained according to Example 435 and the pH value is adjusted to 12.5 with concentrated sodium hydroxide solution, the resulting mixture is stirred for 10 minutes and concentrated hydrochloric acid is then added until the pH value is 4.5-5, the corresponding vinylsulfone dyestuff is obtained. After precipitating with potassium chloride, the dyestuff is filtered off and washed with potassium chloride solution. The dyestuff is dried in vacuo at 50°-60° C. It is identical to the dyestuff described in Example 441.

EXAMPLE 450

4.875 parts of the reaction product of 2 moles of 1,3-diaminobenzene-4-sulfonic acid and 1 mole of cyanuric chloride are diazotized in 100 parts of water, 30 parts of 2 N hydrochloric acid and 50 parts of ice with 4.1 parts of 5 N sodium nitrite solution. The excess nitrite is destroyed with amidosulfonic acid. A solution, prepared from 6.38 parts of 1-amino-8-naphthol-3,6-disulfonic acid, 200 parts of water, 10 parts of 2 N sodium hydroxide solution, 5 parts of crystalline sodium acetate and 50 parts of ice is added dropwise in the course of 25 minutes to this diazonium solution. The mixture is stirred until the coupling reaction has ended. 5.62 parts of 4-β-sulfatoethylsulfonylaniline are then diazotized in 100 parts of water, 30 parts of 2 N hydrochloric acid and 100 parts of ice with 4.1 parts of 5 N sodium nitrite solution and the excess nitrite is destroyed with amidosulfonic acid. After adding to the above dyestuff solution, the pH value is adjusted to 4.5-5 with 10% strength sodium carbonate solution. After the coupling reaction has ended, the blue dyestuff formed is precipitated with potassium chloride. The precipitate is filtered off and washed with potassium chloride solution. The dyestuff is dried in vacuo at 40°-50° C. It is a dark powder. When used to dye or print cotton by conventional processes in the presence of acid-binding agents, blue-black dyeings or prints with very good fastness properties to wet processing and good fastness to light are obtained.

Black dyestuffs which have similarly good properties can be obtained by a similar procedure by using, as the second diazo component in Example 450, and the 2nd diazo components listed under Example 3 to 26 and 51 to 75 in Table 1, in place of the 4-β-sulfatoethylsulfonylaniline.

EXAMPLE 451

If, in the above Example 450, 6.38 parts of 1-amino-8-naphthol-4,6-disulfonic acid are used in place of the 6.38 parts of 1-amino-8-naphthol-3,6-disulfonic acid and in other respects the procedure followed is as described in Example 450, a dyestuff with similar properties is again obtained.

Black dyestuffs which have similarly good properties can be obtained by a similar procedure by using, as the second diazo component in Example 451, the 2nd diazo components listed under Example 27 to 50 and 76 to 100 in Table 1, in place of the 4-β-sulfatoethylsulfonylaniline.

EXAMPLE 452

If, in the above Examples 450 and 451, the 5.62 parts of 4-β-sulfatoethylsulfonylaniline are replaced by 5.94 parts of 4-β-thiosulfatoethylsulfonylaniline and in other respects the procedure followed is the same as that described in the said examples, similar dyestuffs with similar properties are obtained.

EXAMPLE 453

4.875 parts of the reaction product of 2 moles of 1,3-diaminobenzene-4-sulfonic acid and 1 mole of cyanuric chloride are diazotized in 100 parts of water, 30 parts of 2 N hydrochloric acid and 50 parts of ice with 4.1 parts of 5 N sodium nitrite solution. The excess nitrite is removed with amidosulfonic acid. A solution prepared from 6.38 parts of 1-amino-8-naphthol-3,6-disulfonic acid, 200 parts of water, 10 parts of 2 N sodium hydroxide solution, 5 parts of crystalline sodium acetate and 50 parts of ice is added dropwise in the course of 25 minutes to this diazonium solution. The mixture is stirred until the coupling reaction has ended. 3.66 parts of 4-vinylsulfonylaniline are then diazotized in 100 parts of water, 30 parts of 2 N hydrochloric acid and 100 parts of ice with 4.1 parts of 5 N sodium nitrite solution and the excess sodium nitrite is destroyed with amidosulfonic acid. After adding to the above dyestuff solution, the pH value is adjusted to 4.5–5.0 with 10% strength sodium carbonate solution. After the coupling reaction has ended, the dyestuff formed is precipitated with potassium chloride. It is filtered off and washed with potassium chloride solution. The dyestuff is dried in vacuo at 40°–50° C. When used to dye or print cotton by conventional processes in the presence of an acid-binding agent, it gives blue-black dyeings and prints with very good fastness properties to wet processing and good fastness to light.

Black dyestuffs which have similarly good properties can be obtained by a similar procedure by using, as the second diazo component in Example 453, the 2nd diazo components listed under Example 104 to 128 and 154 to 178 in Table 2, in place of the 4-vinylsulfonylaniline.

EXAMPLE 454

If, in the above Example 453, 6.38 parts of 1-amino-8-naphthol-4,6-disulfonic acid are used in place of the 6.38 parts of 1-amino-8-naphthol-3,6-disulfonic acid and in other respects the procedure followed is as described in the said example, a dyestuff with similar properties is obtained.

Black dyestuffs which have similarly good properties can be obtained by a similar procedure by using, as the second diazo component in Example 454, the 2nd diazo components listed under Example 129 to 153 and 179 to 203 in Table 2, in place of the 4-vinylsulfonylaniline.

EXAMPLE 455

If, in the above Examples 453 and 454, 4.39 parts of 4-β-chloroethylsulfonylaniline are employed in place of the 3.66 parts of 4-vinylsulfonylaniline and in other respects the procedure is as described in the said examples, dyestuffs with similar properties are obtained.

EXAMPLE 456

5.62 parts of 4-β-sulfatoethylsulfonylaniline are diazotized in 100 parts of water, 30 parts of 2 N hydrochloric acid and 50 parts of ice with 4.1 parts of 5 N sodium nitrite solution. The excess nitrite is removed with amidosulfonic acid. A suspension of 6.38 parts of 1-amino-8-naphthol-3,6-disulfonic acid in 400 parts of water and 100 parts of ice is added to this diazonium solution. After the coupling reaction has ended, a diazo suspension of the reaction product of 2 moles of 1,3-diaminobenzene-4-sulfonic acid and 1 mole of cyanuric chloride is added to this red dyestuff solution. This diazo suspension has been prepared from 4.875 parts of that diamino reaction product with 30 parts of 2 N hydrochloric acid and 4.1 parts of 5 N sodium nitrite solution in 100 parts of water and 50 parts of ice, the excess nitrite having been destroyed with amidosulfonic acid after diazotization. After adding 5 parts of crystalline sodium acetate to the whole coupling mixture, the pH value is adjusted to 6 with 10% strength sodium carbonate solution. After the coupling reaction has ended, the blue dyestuff formed is isolated by precipitating with potassium chloride. It is filtered off, washed with potassium chloride solution and dried in vacuo at 40°–50° C. A dark powder is obtained which dissolves in water to give a greenish-tinged blue color. When applied to cotton by conventional processes in the presence of alkaline agents, the dyestuff gives greenish-tinged black dyeings or prints with very good fastness properties to wet processing and good fastness to light.

Black dyestuffs which have similarly good properties can be obtained by a similar procedure by using, as the first diazo component in Example 456, the 1st diazo components listed under Example 207 to 233 and 261 to 286 in Table 3, in place of the 4-β-sulfatoethylsulfonylaniline.

EXAMPLE 457

If, in the above Example 456, 6.38 parts of 1-amino-8-naphthol-4,6-disulfonic acid are taken in place of the 6.38 parts of 1-amino-8-naphthol-3,6-disulfonic acid and in other respects the procedure is as described in the said example, a similar dyestuff with similar properties is obtained.

Black dyestuffs which have similarly good properties can be obtained by a similar procedure by using, as the first diazo component in Example 457, the 1st diazo components listed under Example 234 to 260 and 287 to 313 in Table 3, in place of the 4-β-sulfatoethylsulfonylaniline.

EXAMPLE 458

If, in Examples 456 and 457, 5.94 parts of 4-β-thiosulfatoethylsulfonylaniline are diazotized in place of 5.62 parts of 4-β-sulfatoethylsulfonylaniline and in other respects the procedure followed is the same as that described in the said examples, polyazo dyestuffs with similar properties are obtained.

EXAMPLE 459

3.66 parts of 4-vinylsulfonylaniline are diazotized in 100 parts of water, 30 parts of 2 N hydrochloric acid and 100 parts of ice with 4.1 parts of 5 N sodium nitrite solution and the diazonium solution is freed from excess nitrite with amidosulfonic acid. A suspension of 6.38 parts of 1-amino-8-naphthol-3,6-disulfonic acid in 400 parts of water and 100 parts of ice is added. After the coupling reaction has ended, a diazonium suspension is prepared by diazotizing 4.875 parts of the reaction product of 2 moles of 1,3-diaminobenzene-4-sulfonic acid and 1 mole of cyanuric chloride with 4.1 parts of an aqueous 5 N sodium nitrite solution in 100 parts of water, 30 parts of 2 N hydrochloric acid and 50 parts of ice, the excess nitrite being removed with amidosulfonic acid after diazotization. This diazo suspension is added to the azo solution prepared, 5 parts of crystalline sodium acetate are added and the pH value is adjusted to 6 with 10% strength sodium carbonate solution. When the coupling reaction has ended, the blue dyestuff formed is precipitated with potassium chloride, filtered off and washed with potassium chloride solution. It is dried in vacuo at 40°-50° C. When applied to cotton by conventional processes in the presence of an acid-binding agent, this dyestuff gives black dyeings or prints with very good fastness properties to wet processing and good fastness to light.

Black dyestuffs which have similarly good properties can be obtained by a similar procedure by using, as the first diazo component in Example 459, the 1st diazo components listed under Example 317 to 342 and 369 to 394 in Table 4, in place of the 4-vinylsulfonylaniline.

EXAMPLE 460

If, in the above Example 459, the 6.38 parts of 1-amino-8-naphthol-3,6-disulfonic acid are replaced by 6.38 parts of 1-amino-8-naphthol-4,6-disulfonic acid and the procedure followed is the same as that described in the said example, a similar dyestuff with similar properties is obtained.

Black dyestuffs which have similarly good properties can be obtained by a similar procedure by using, as the first diazo component in Example 460, the 1st diazo components listed under Example 343 to 368 and 395 to 420 in Table 4, in place of the 4-vinylsulfonylaniline.

EXAMPLE 461

If, in the above Examples 459 and 460, 4.39 parts of 4-$\beta$-chloroethylsulfonylaniline are used in place of the 3.66 parts of 4-vinylsulfonylaniline and in other respects the procedure followed is the same as that described in the said examples, 2 further dyestuffs with similar properties are obtained.

EXAMPLE 462

4.875 parts of the reaction product of 2 moles of 1,4-diaminobenzene-3-sulfonic acid and 1 mole of cyanuric chloride are diazotized in 100 parts of water, 30 parts of 2 N hydrochloric acid and 50 parts of ice with 4.1 parts of 5 N sodium nitrite solution. The excess nitrite is removed with amidosulfonic acid. A solution of 6.38 parts of 1-amino-8-naphthol-3,6-disulfonic acid in 400 parts of water, 10 parts of 2 N sodium hydroxide solution, 5 parts of crystalline sodium acetate and 100 parts of ice is added dropwise to this diazonium solution in the course of 30 minutes. The reaction mixture is stirred until the coupling reaction has ended. The diazonium solution prepared from 5.62 parts of 4-$\beta$-sulfatoethylsulfonylaniline, 100 parts of water, 30 parts of 2 N hydrochloric acid, 100 parts of ice and 4.1 parts of 5 N sodium nitrite solution, with the subsequent addition of amidosulfonic acid to remove the excess nitrite, is then added. After adding 5 parts of crystalline sodium acetate, the pH value is adjusted to 4.5 with 10% strength sodium carbonate solution. After the coupling reaction has ended, the blue dyestuff formed is precipitated with potassium chloride. It is filtered off and washed with potassium chloride solution and dried in vacuo at 40°-50° C. The dark powder dissolves in water to give a blue color. When applied by conventional processes in the presence of acid-binding agents, this dyestuff gives both dyeings and prints in black shades on cotton and these dyeings and prints have very good fastness properties to wet processing and good fastness to light.

Black dyestuffs which have similarly good properties can be obtained by a similar procedure by using, as the second diazo component in Example 462, the 2nd diazo components listed under Example 3 to 26 and 51 to 75 in Table 1, in place of the 4-$\beta$-sulfatoethylaniline.

EXAMPLE 463

If, in the above Example 462, the 6.38 parts of 1-amino-8-naphthol-3,6-disulfonic acid are replaced by 6.38 parts of 1-amino-8-naphthol-4,6-disulfonic acid and in other respects the procedure followed is as described above, a dyestuff with similar properties is again obtained.

Black dyestuffs which have similarly good properties can be obtained by a similar procedure by using, as the second diazo component in Example 463, the 2nd diazo components listed under Example 27 to 50 and 76 to 100 in Table 1, in place of the 4-$\beta$-sulfatoethylsulfonylaniline.

EXAMPLE 464

If, in the above Examples 462 and 463, the 5.62 parts of 4-$\beta$-sulfatoethylsulfonylaniline are replaced by 5.94 parts of 4-$\beta$-thiosulfatoethylsulfonylaniline and in other respects the procedure followed is the same as that described in the said examples, dyestuffs with similar properties are obtained.

EXAMPLE 465

3.66 parts of 4-vinylsulfonylaniline are diazotized in 100 parts of water, 30 parts of 2 N hydrochloric acid and 100 parts of ice with 4.1 parts of 5 N sodium nitrite solution and the diazonium solution is then freed from excess nitrite with amidosulfonic acid. A suspension of 6.38 parts of 1-amino-8-naphthol-3,6-disulfonic acid in 400 parts of water and 100 parts of ice is added. After the coupling reaction has ended, a diazonium suspension from the reaction product of 2 moles of 1,4-diaminobenzene-3-sulfonic acid and 1 mole of cyanuric chloride is added. This diazo suspension had been prepared from 4.875 parts of that diamino-reaction product by means of 4.1 parts of 5 N sodium nitrite solution in 100 parts of water, 30 parts of 2 N hydrochloric acid and 50 parts of ice, the excess nitrite having been removed with amidosulfonic acid. 5 parts of crystalline sodium acetate are then added to the coupling mixture and the pH value is adjusted to 6-6.5 with 10% strength sodium carbonate solution. When the coupling reaction has ended, the dyestuff formed is precipitated with potassium chloride, filtered off and washed with potassium chloride solution. It is dried in vacuo at 40°-50° C. When applied to cotton by conventional processes in the presence of acid-binding agents, this dyestuff gives black dyeings and prints with very good fastness properties to wet processing and good fastness to light.

Black dyestuffs which have similarly good properties can be obtained by a similar procedure by using, as the first diazo component in Example 465, the 1st diazo components listed under Example 317 to 342 and 369 to 394 in Table 4, in place of the 4-vinylsulfonylaniline.

EXAMPLE 466

If, in Example 465, the 6.38 parts of 1-amino-8-naphthol-3,6-disulfonic acid are replaced by 6.38 parts of 1-amino-8-naphthol-4,6-disulfonic acid and in other respects the procedure followed is the same as that described in the said example, a dyestuff with similar properties is obtained.

Black dyestuffs which have similarly good properties can be obtained by a similar procedure by using, as the first diazo component in Example 466, the 1st diazo components listed under Example 343 to 368 and 395 to 420 in Table 4, in place of the 4-vinylsulfonylaniline.

EXAMPLE 467

If, in the above Examples 465 and 466, the 3.66 parts of 4-vinylsulfonylaniline are replaced by 4.39 parts of 4-β-chloroethylsulfonylaniline and in other respects the procedure followed is the same as that described in the said examples, 2 further dyestuffs with similar properties are obtained.

EXAMPLE 468

4.875 parts of the reaction product of 2 moles of 1,4-diaminobenzene and 1 mole of cyanuric chloride are diazotized in 100 parts of water, 30 parts of 2 N hydrochloric acid and 50 parts of ice with 4.1 parts of 5 N sodium nitrite solution. The excess nitrite is removed with amidosulfonic acid. A solution of 6.38 parts of 1-amino-8-naphthol-3,6-disulfonic acid in 400 parts of water, 10 parts of 2 N sodium hydroxide solution, 5 parts of crystalline sodium acetate and 100 parts of ice is added dropwise to this diazonium solution in the course of 30 minutes. The reaction mixture is stirred until the coupling reaction has ended. The diazonium solution prepared from 3.66 parts of 4-vinylsulfonylaniline, 100 parts of water, 30 parts of 2 N hydrochloric acid, 100 parts of ice and 4.1 parts of 5 N sodium nitrite solution is then added, after the excess nitrite has been removed with amidosulfonic acid. 5 parts of crystalline sodium acetate are introduced and the pH value is adjusted to 4.5–5 with 10% strength sodium carbonate solution. After the coupling reaction has ended, the dyestuff formed is precipitated with potassium chloride, filtered off and washed with potassium chloride solution. It is dried in vacuo at 40°–50° C. When dyed or printed on cotton by conventional processes in the presence of acid-binding agents, the dyestuff gives black dyeings and prints with very good fastness properties to wet processing and good fastness to light.

Black dyestuffs which have similarly good properties can be obtained by a similar procedure by using, as the second diazo component in Example 468, the 2nd diazo components listed under Example 104 to 128 and 154 to 178 in Table 2, in place of the 4-vinylsulfonylaniline.

EXAMPLE 469

If, in Example 468, the 6.38 parts of 1-amino-8-naphthol-3,6-disulfonic acid are replaced by 6.38 parts of 1-amino-8-naphthol-4,6-disulfonic acid and in other respects the procedure followed is as described in the said example, a similar dyestuff with similar properties is obtained.

Black dyestuffs which have similarly good properties can be obtained by a similar procedure by using, as the second diazo component in Example 469, the 2nd diazo components listed under Example 129 to 153 and 179 to 203 in Table 2, in place of the 4-vinylsulfonylaniline.

EXAMPLE 470

If, in Examples 468 and 469, 4.39 parts of 4-β-chloroethylsulfonylaniline are employed in place of the 3.66 parts of 4-vinylsulfonylaniline and in other respects the procedure followed is the same as that described in the said examples, 2 further dyestuffs with similar properties are obtained.

EXAMPLE 471

5.62 parts of 4-β-sulfatoethylsulfonylaniline are diazotized in 100 parts of water, 30 parts of 2 N hydrochloric acid and 50 parts of ice with 4.1 parts of 5 N sodium nitrite solution. The excess nitrite is destroyed with amidosulfonic acid. A suspension of 6.38 parts of 1-amino-8-naphthol-3,6-disulfonic acid in 400 parts of water and 100 parts of ice is added to this diazonium solution. The reaction mixture is stirred until the coupling reaction has ended. The diazo suspension obtained from: 3.44 parts of 4,4'-diaminodiphenyl-2,2'-disulfonic acid, 25 parts of water, 10 parts of 2 N sodium hydroxide solution and 4 parts of 5 N sodium nitrite solution, stirred into 30 parts of 2 N hydrochloric acid, 50 parts of ice and 0.5 part of 5 N sodium nitrite solution, this mixture being stirred for a further 15 minutes and amidosulfonic acid then being added in order to remove the excess nitrite, is then added to this red dyestuff solution. After adding to the red dyestuff solution, 5 parts of crystalline sodium acetate are introduced and the pH value is adjusted to 7 with 10% strength sodium carbonate solution. The mixture is stirred until the coupling reaction has ended. A blue dyestuff solution is obtained. The dyestuff formed is precipitated with potassium chloride. It is filtered off and washed with potassium chloride solution. After drying at 60°–70° C. in vacuo, a dark dyestuff powder is obtained. On cotton, black dyeings and prints with very good fastness properties to wet processing and good fastness to light are obtained by known processes in the presence of acid-binding agents.

Black dyestuffs which have similarly good properties can be obtained by a similar procedure by using, as the first diazo component in Example 471, the 1st diazo components listed under Example 207 to 233 and 261 to 286 in Table 3, in place of the 4-β-sulfatoethylsulfonylaniline.

EXAMPLE 472

If, in Example 471, the 6.38 parts of 1-amino-8-naphthol-3,6-disulfonic acid are replaced by 6.38 parts of 1-amino-8-naphthol-4,6-disulfonic acid, an otherwise identical procedure gives a further dyestuff with similar properties.

Black dyestuffs which have similarly good properties can be obtained by a similar procedure by using, as the first diazo component in Example 472, the 1st diazo components listed under Example 234 to 260 and 287 to 313 in Table 3, in place of the 4-β-sulfatoethylsulfonylaniline.

Further dyestuffs according to the invention, which can be prepared in a manner analogous to that described in the above examples, are listed in Table 5 which follows:

TABLE 5
| Example | 1st diazo component | Coupling component | 2nd diazo component | Color shade on cotton |
|---|---|---|---|---|
| 473 | 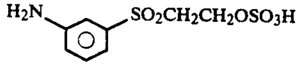 | 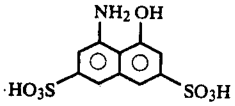 | 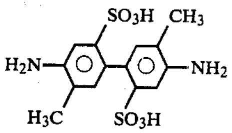 | black |
| 474 | 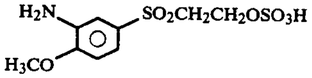 | ″ | ″ | black |
| 475 | 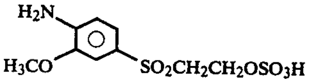 | ″ | ″ | black |
| 476 | 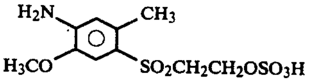 | ″ | ″ | black |
| 477 | 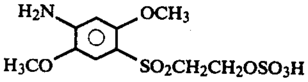 | ″ | ″ | black |
| 478 | 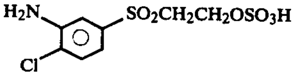 | ″ | ″ | black |
| 479 | 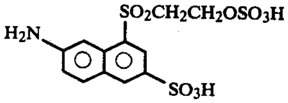 | ″ | 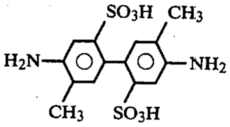 | black |
| 480 | 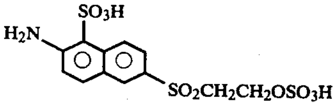 | ″ | ″ | black |
| 481 | 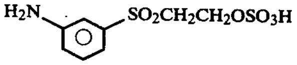 | 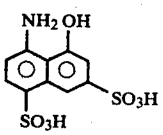 | 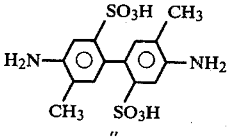 | black |
| 482 | 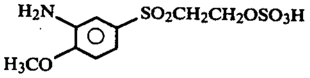 | ″ | ″ | black |
| 483 | 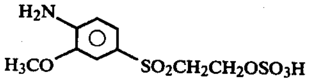 | ″ | ″ | black |
| 484 | 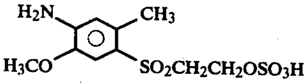 | ″ | ″ | black |
| 485 | 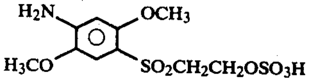 | ″ | ″ | black |
| 486 | 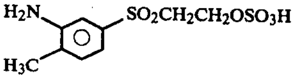 | ″ | ″ | black |
| 487 | 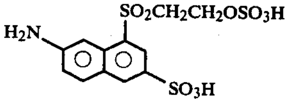 | ″ | ″ | black |
| 488 | 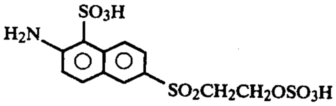 | ″ | ″ | black |
| 489 | 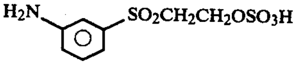 | 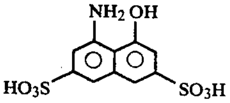 | 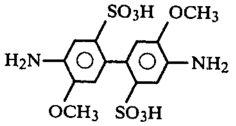 | black |

TABLE 5-continued
| Example | 1st diazo component | Coupling component | 2nd diazo component | Color shade on cotton |
|---|---|---|---|---|
| 490 | 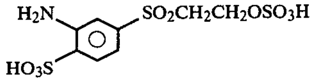 | " | " | black |
| 491 | 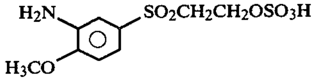 | " | " | black |
| 492 | 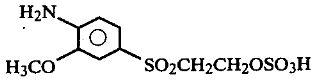 | " | " | black |
| 493 | 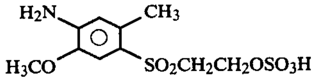 | " | " | black |
| 494 | 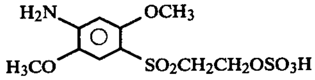 | " | " | black |
| 495 | 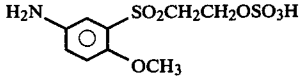 | " | " | black |
| 496 | 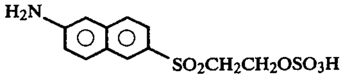 | " | " | black |
| 497 | 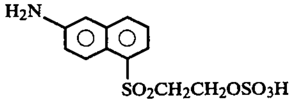 | " | " | black |
| 498 | 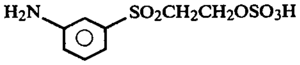 | 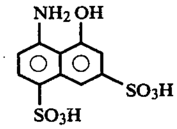 | " | black |
| 499 | 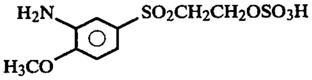 | " | " | black |
| 500 | 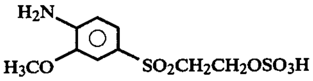 | " | " | black |
| 501 | 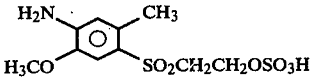 | " | " | black |
| 502 | 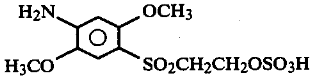 | " | " | black |
| 503 | 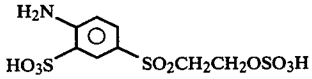 | " | " | black |
| 504 | 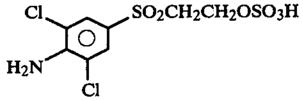 | " | " | black |
| 505 | 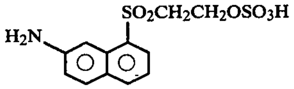 | " | " | black |
| 506 | 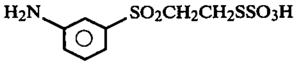 | 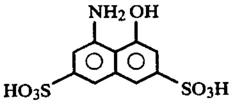 | " | black |
| 507 | 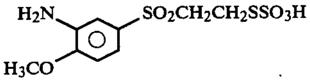 | " | " | black |
| 508 | 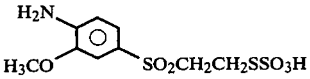 | " | " | black |

TABLE 5-continued
| Example | 1st diazo component | Coupling component | 2nd diazo component | Color shade on cotton |
|---|---|---|---|---|
| 509 | 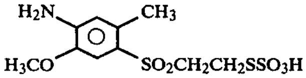 | " | " | black |
| 510 | 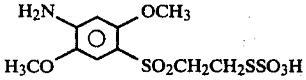 | " | " | black |
| 511 | 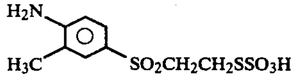 | " | " | black |
| 512 | 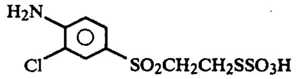 | " | " | black |
| 513 | 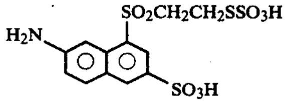 | " | " | black |
| 514 | 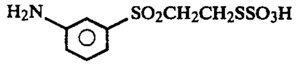 | 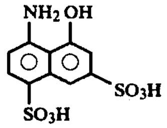 | " | black |
| 515 | 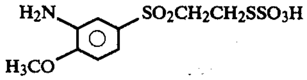 | " | " | black |
| 516 | 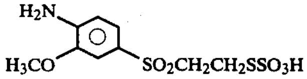 | " | " | black |
| 517 | 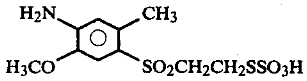 | " | " | black |
| 518 | 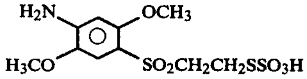 | " | " | black |
| 519 | 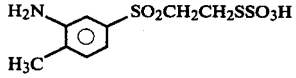 | " | " | black |
| 520 | 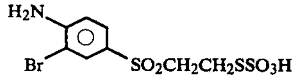 | " | " | black |
| 521 | 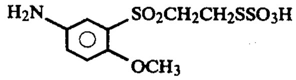 | " | " | black |
| 522 | 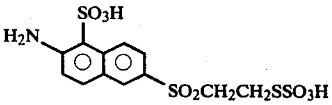 | " | " | black |
| 523 | 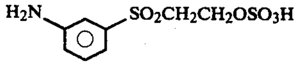 | 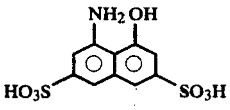 | 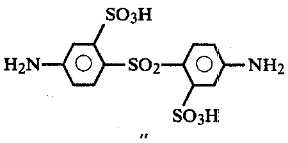 | black |
| 524 | 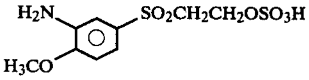 | " | " | black |
| 525 | 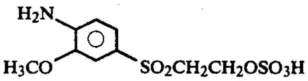 | " | " | black |
| 526 | 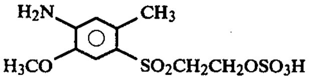 | " | " | black |
| 527 | 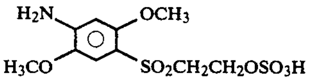 | " | " | black |

TABLE 5-continued
| Example | 1st diazo component | Coupling component | 2nd diazo component | Color shade on cotton |
|---|---|---|---|---|
| 528 | 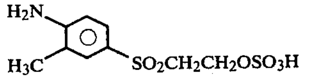 | " | " | black |
| 529 | 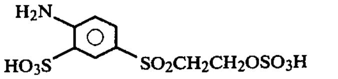 | " | " | black |
| 530 | 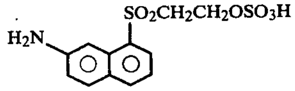 | " | " | black |
| 531 | 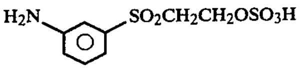 | 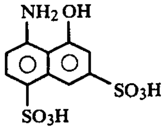 | " | black |
| 532 | 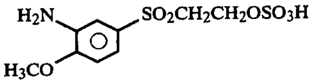 | " | " | black |
| 533 | 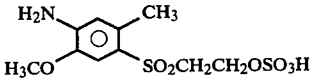 | " | " | black |
| 534 | 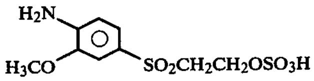 | " | 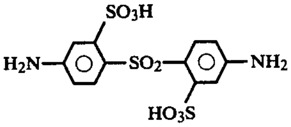 | black |
| 535 | 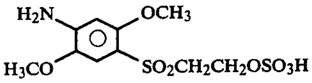 | " | " | black |
| 536 | 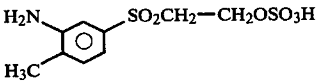 | " | " | black |
| 537 | 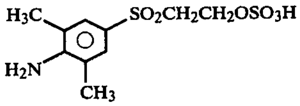 | " | " | black |
| 538 | 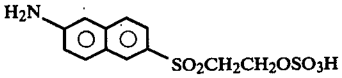 | " | " | black |
| 539 | 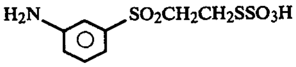 | 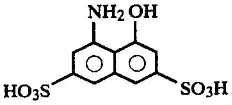 | " | black |
| 540 | 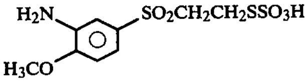 | " | " | black |
| 541 | 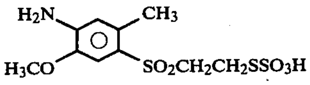 | " | " | black |
| 542 | 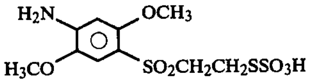 | " | " | black |
| 543 | 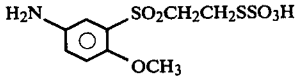 | " | " | black |
| 544 | 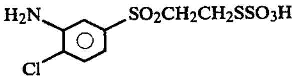 | " | " | black |
| 545 | 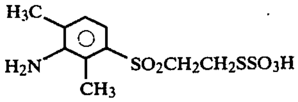 | " | " | black |

TABLE 5-continued
| Example | 1st diazo component | Coupling component | 2nd diazo component | Color shade on cotton |
|---|---|---|---|---|
| 546 | 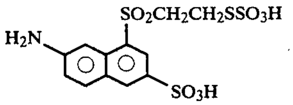 | " | " | black |
| 547 | 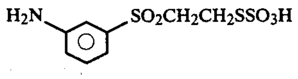 | 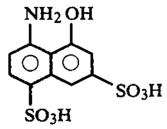 | " | black |
| 548 | 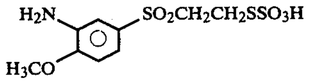 | " | " | black |
| 549 | 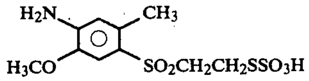 | " | " | black |
| 550 | 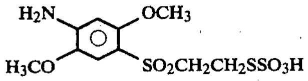 | " | " | black |
| 551 | 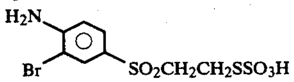 | " | " | black |
| 552 | 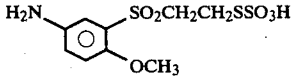 | " | " | black |
| 553 | 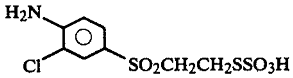 | " | 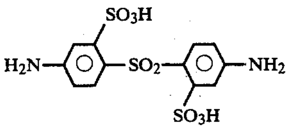 | black |
| 554 | 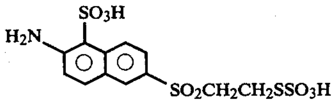 | " | " | black |
| 555 | 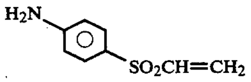 | " | " | black |
| 556 | 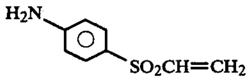 | " | " | black |
| 557 | 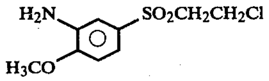 | " | " | black |
| 558 | 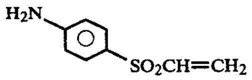 | 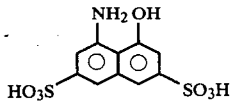 | " | black |
| 559 | 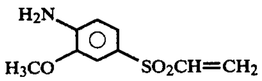 | " | " | black |
| 560 | 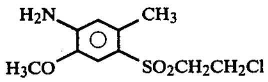 | " | " | black |
| 561 | 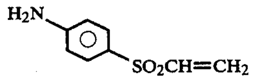 | " | 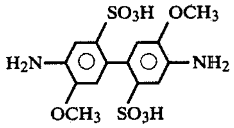 | black |
| 562 | 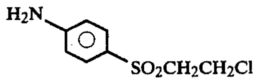 | " | " | black |
| 563 | 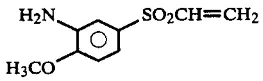 | " | " | black |

TABLE 5-continued
| Example | 1st diazo component | Coupling component | 2nd diazo component | Color shade on cotton |
|---|---|---|---|---|
| 564 | 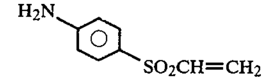 | 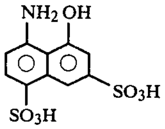 | " | black |
| 565 | 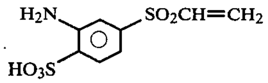 | " | " | black |
| 566 | 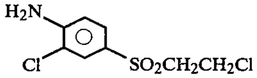 | " | " | black |
| 567 | 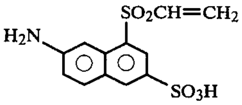 | " | " | black |
| 568 | 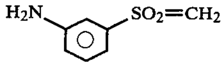 | " | 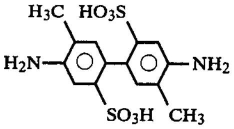 | black |
| 569 | 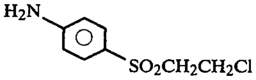 | " | " | black |
| 570 | 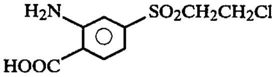 | " | " | black |
| 571 | 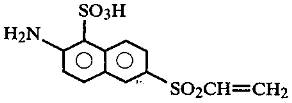 | " | " | black |
| 572 | 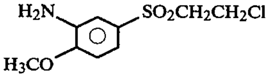 | 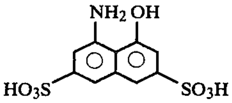 | " | black |
| 573 | 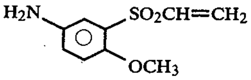 | " | " | black |
| 574 | 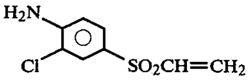 | " | " | black |
| 575 | 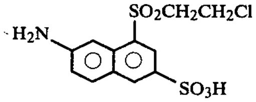 | " | " | black |
| 576 | 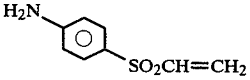 | " | 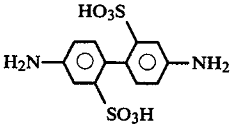 | black |
| 577 | 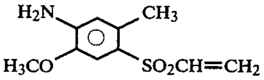 | " | " | black |
| 578 | 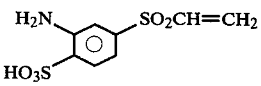 | " | " | black |
| 579 | 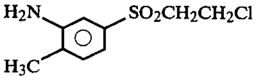 | " | " | black |
| 580 | 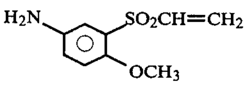 | " | " | black |

TABLE 5-continued

| Example | 1st diazo component | Coupling component | 2nd diazo component | Color shade on cotton |
|---|---|---|---|---|
| 581 | 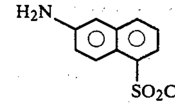 | " | " | black |
| 582 | 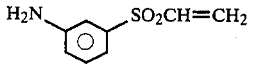 | 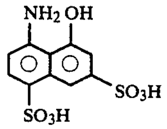 | " | black |
| 583 | 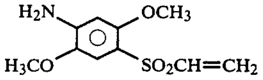 | " | " | black |
| 584 | 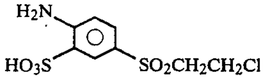 | " | " | black |
| 585 | 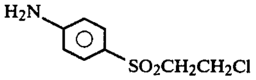 | " | " | black |
| 586 | 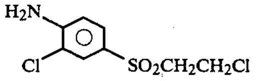 | " | " | black |
| 587 | 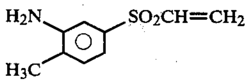 | " | " | black |
| 588 | 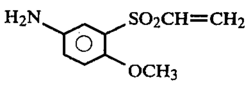 | " | " | black |
| 589 | 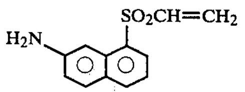 | " | " | black |
| 590 | 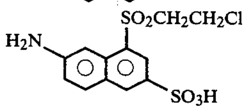 | " | " | black |

EXAMPLE 591

5.62 parts of 4-β-sulfatoethylsulfonylaniline are diazotized in 100 parts of water, 30 parts of 2 N hydrochloric acid and 50 parts of ice with 4.1 parts of 5 N sodium nitrite solution and the diazonium solution is freed from excess nitrite with amidosulfonic acid. A suspension of 6.38 parts of 1-amino-8-naphthol-3,6-disulfonic acid in 400 parts of water and 100 parts of ice is added to this diazonium solution. The reaction mixture is stirred until the coupling reaction has ended. The diazo solution prepared from 1.98 parts of 4,4′-diaminodiphenylmethane, 25 parts of 2 N hydrochloric acid, 50 parts of ice and 4.1 parts of 5 N sodium nitrite solution is then added, after the excess nitrite has been removed with amidosulfonic acid. After adding 5 parts of crystalline sodium acetate, the pH value is adjusted to 7 with 10% strength sodium carbonate solution and the reaction mixture is stirred until the coupling reaction has ended. This gives a blue dyestuff solution and the pH value thereof is corrected to a pH value of 5 with a little hydrochloric acid. The dyestuff formed is isolated by spray-drying. When applied to cotton by conventional processes in the presence of an acid-binding agent, this dyestuff gives black dyeings or prints with very good fastness properties to wet processing and good fastness to light.

Black dyestuffs which have similarly good properties can be obtained by a similar procedure by using, as the first diazo component in Example 591, the 1st diazo components listed under Example 207 to 233 and 261 to 286 in Table 3 and under Example 317 and 342 and 369 to 394 in Table 4, in place of the 4-β-sulfatoethylsulfonylaniline.

EXAMPLE 592

If, in Example 591, the 6.38 g of 1-amino-8-naphthol-3,6-disulfonic acid are replaced by 6.38 g of 1-amino-8-naphthol-4,6-disulfonic acid, a black dyestuff with similar properties is obtained.

Black dyestuffs which have similarly good properties can be obtained by a similar procedure by using, as the first diazo component in Example 592, the 1st diazo components listed under Example 234 to 260 and 287 to 313 in Table 3 and under Example 343 to 368 and 395 to 420 in Table 4, in place of the 4-β-sulfatoethylsulfonylaniline.

Further dyestuffs which can be prepared in a manner similar to that described above are listed in Table 6 which follows. When applied to cotton by conventional processes in the presence of an acid-binding agent, they give dyeings or prints with good fastness properties to wet processing and good fastness to light.

TABLE 6
| Example | 1st diazo component | Coupling component | 2nd diazo component | Color shade on cotton |
|---|---|---|---|---|
| 593 | 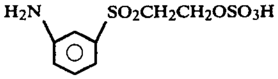 | 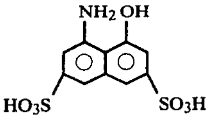 | 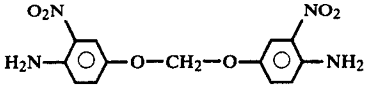 | black |
| 594 | 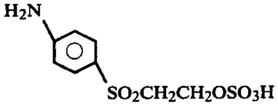 | " | " | black |
| 595 | 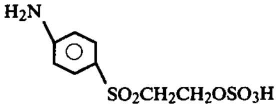 | 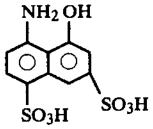 | " | black |
| 596 | 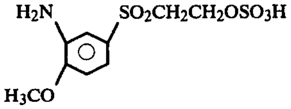 | " | " | black |
| 597 | 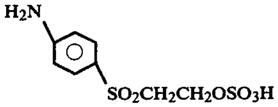 | 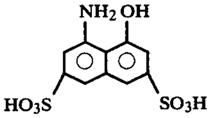 | 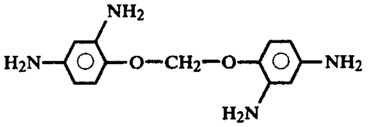 | black |
| 598 | 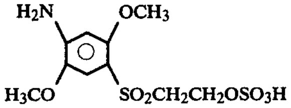 | " | " | black |
| 599 | 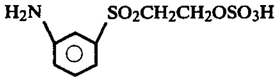 | 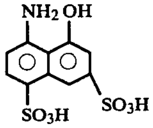 | 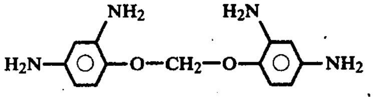 | black |
| 600 | 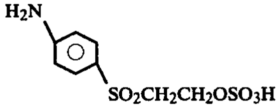 | " | " | black |
| 601 | 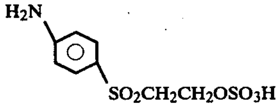 | " | 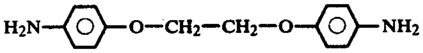 | black |
| 602 | 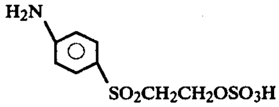 | 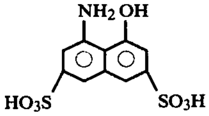 | " | black |
| 603 | 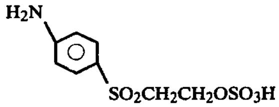 | " | 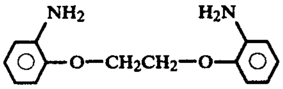 | black |
| 604 | 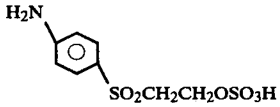 | 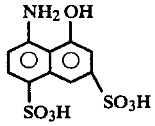 | " | black |
| 605 | 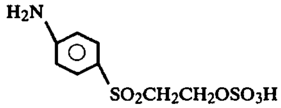 | " | 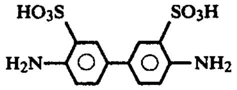 | black |
| 606 | 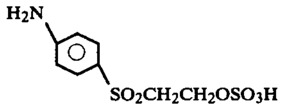 | 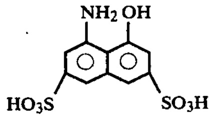 | " | black |

TABLE 6-continued
| Example | 1st diazo component | Coupling component | 2nd diazo component | Color shade on cotton |
|---|---|---|---|---|
| 607 | 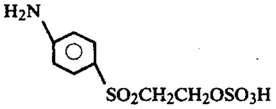 | " | 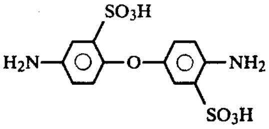 | black |
| 608 | 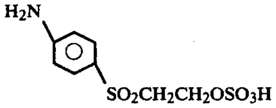 | 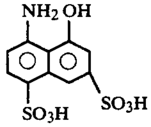 | " | black |
| 609 | 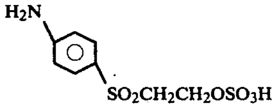 | " | 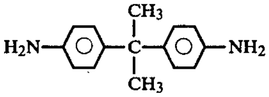 | black |
| 610 | 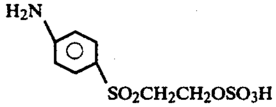 | 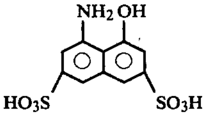 | " | black |
| 611 | 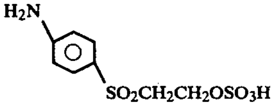 | " | 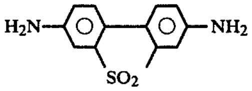 | black |
| 612 | 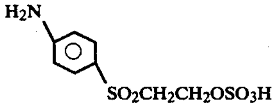 | 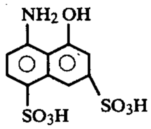 | " | black |
| 613 | 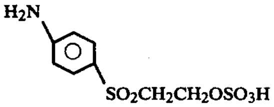 | " | 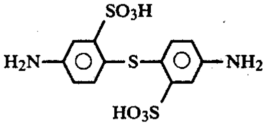 | black |
| 614 | 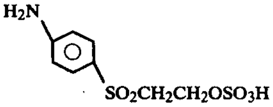 | 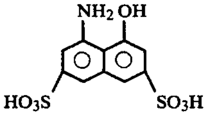 | " | black |
| 615 | 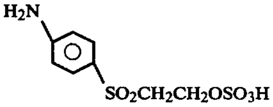 | " | 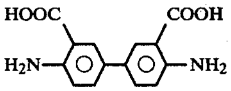 | black |
| 616 | 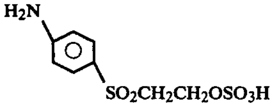 | 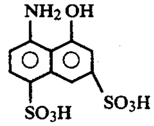 | " | black |
| 617 | 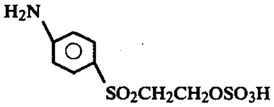 | 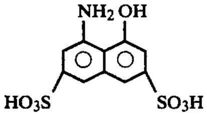 | 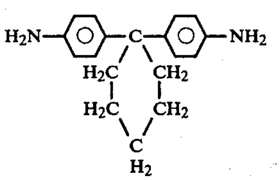 | black |
| 618 | 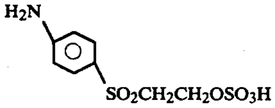 | " | 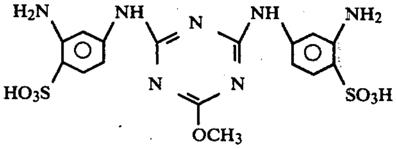 | black |
| 619 | 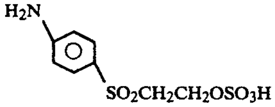 | 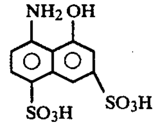 | " | black |

TABLE 6-continued

| Example | 1st diazo component | Coupling component | 2nd diazo component | Color shade on cotton |
|---|---|---|---|---|
| 620 | 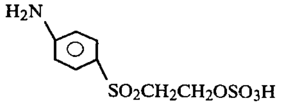 | " | 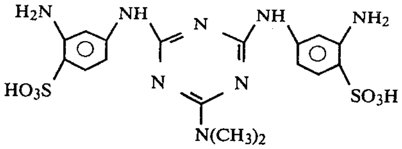 | black |
| 621 | 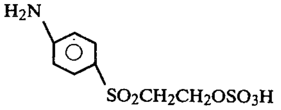 | 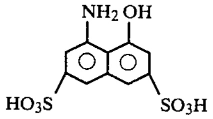 | " | black |
| 622 | 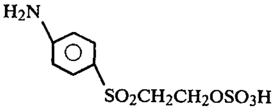 | " | 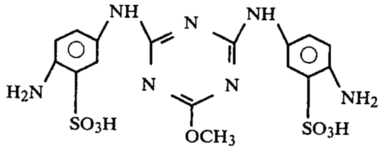 | black |
| 623 | 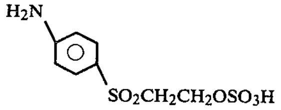 | 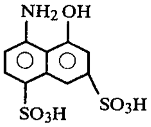 | " | black |
| 624 | 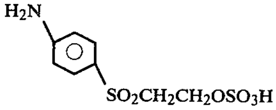 | " | 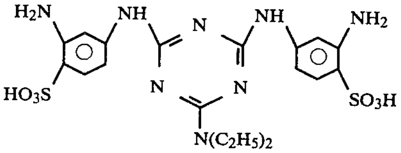 | black |
| 625 | 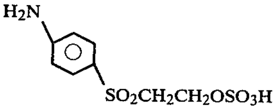 | 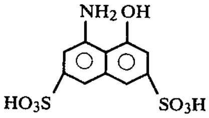 | " | black |

We claim:

1. A water-soluble dyestuff which, in the form of the free acid, has the formula (1)

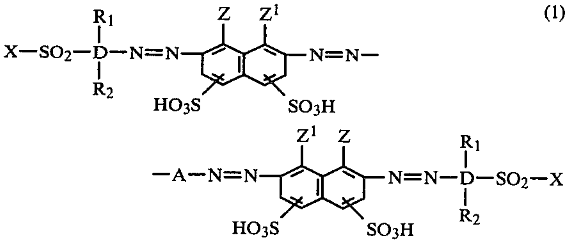

(1)

in which

D is a benzene nucleus or naphthalene nucleus, $R_1$ is in the ortho-position relative to the azo group and is hydrogen, halogen, lower alkyl, lower alkoxy, carboxy or sulfo, $R_2$ is hydrogen, halogen, lower alkyl, lower alkoxy or sulfo, $R_1$ and $R_2$ being identical or different from one another, X is $\beta$-thiosulfatoethyl, $\beta$-chloroethyl, $\beta$-sulfatoethyl or vinyl, A is

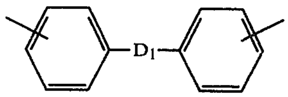

or

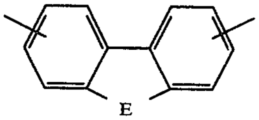

in which the benzene nuclei may be substituted and $D_1$ is a direct covalent bond or a bridge member and E is a member of the formula —O—, —S—, —NH—, or —$SO_2$—, Z is the grouping —$(OH)_{n-1}$ or —$(NH_2)_{2-n}$, and $Z^1$ is the grouping —$(OH)_{2-n}$ or —$(NH_2)_{n-1}$ in which n is the number 1 or 2.

2. A water-soluble dyestuff which, in the form of the free acid, has the formula

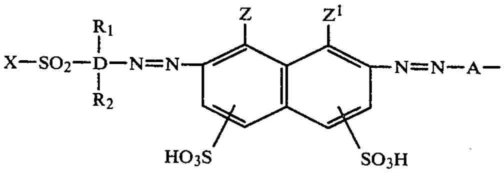

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

8 PT.

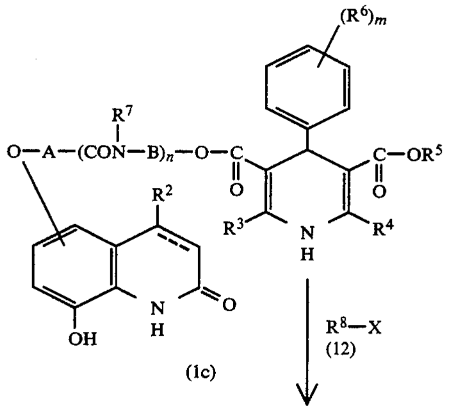

(1c)

$R^8$—X
(12)

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

$$\cos\beta^* = \frac{K_2 - n\frac{T'}{v''}}{\sqrt{K_1^2 + \left(K_2 - n\frac{T'}{v''}\right)^2 + K_3^2}}$$

$$v'_{ref}(t) = K\,r\,\delta\left(t - \frac{2L - 2d_s}{v_w}\right) + K(1 - r^2)e^{-2\alpha s d s}$$

$$(K_1x + K_2y + K_3z + T) + n(K''_1x + K''_2y + K''_3z + T'') = 0$$

are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

8 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

= 101.2 Aperture ratio: 1:1.10
agnification of projection: $-7.997^x$
alf angle of view: 28.56°

| | | | |
|---|---|---|---|
| 43.454 | $d_1 = 11.0$ | $n_1 = 1.49380$ | $L_1$ |
| -1542.254 | $d_2 = 68$ | | |
| 16.976 | $d_3 = 20.0$ | $n_2 = 1.62286$ | $L_2$ |
| 10.914 | $d_4 = 2.87$ | | |
| -89.375 | $d_5 = 5.0$ | $n_3 = 1.59501$ | $L_3$ |
| -127.071 | $d_6 = 58.8$ | | |
| -48.609 | $d_7 = 5$ | $n_4 = 1.49380$ | $L_4$ |
| ∞ | | | |
| ∞ | $d_8 = 5$ | $n_5 = 1.45000$ | S |
| ∞ | $d_9 = 8$ | $n_6 = 1.51872$ | G |

| $r_1$ ($L_1$) | $r_6$ ($L_3$) | $r_7$ ($L_4$) |
|---|---|---|
| K = 1.0 | K = 1.0 | K = 0.0 |
| $C_2$ = 0.0 | $C_2$ = 0.0 | $C_2$ = 0.0 |
| $C_4 = -0.15691 \times 10^{-6}$ | $C_4 = +0.95381 \times 10^{-7}$ | $C_4 = -0.22891 \times 10^{-5}$ |
| $C_6 = -0.40068 \times 10^{-10}$ | $C_6 = -0.73871 \times 10^{-10}$ | $C_6 = +0.12283 \times 10^{-9}$ |
| $C_8 = +0.21016 \times 10^{-13}$ | $C_8 = +0.12280 \times 10^{-13}$ | $C_8 = +0.84230 \times 10^{-13}$ |
| $C_{10} = -0.37685 \times 10^{-17}$ | $C_{10} = -0.33177 \times 10^{-17}$ | $C_{10} = -0.20592 \times 10^{-16}$ |

$f_1 = 314.6$
$f_2 = 88.0$
$f_3 = -481.2$
$f_4 = -99.6$

100mm

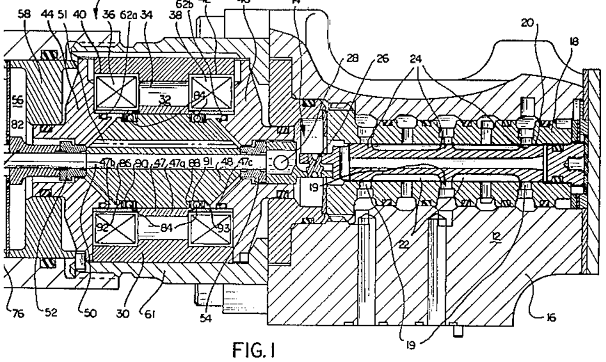

FIG. 1

IMAGE SYSTEM
TEST TARGET
A
U.S. DEPARTMENT OF COMMERCE
PATENT AND TRADEMARK OFFICE